United States Patent
Noguchi

(10) Patent No.: US 9,114,725 B2
(45) Date of Patent: Aug. 25, 2015

(54) VEHICLE DRIVE DEVICE AND METHOD FOR CONTROLLING VEHICLE DRIVE DEVICE

(71) Applicant: HONDA MOTOR CO., LTD., Tokyo (JP)

(72) Inventor: Masatoshi Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 13/853,615

(22) Filed: Mar. 29, 2013

(65) Prior Publication Data

US 2013/0261864 A1     Oct. 3, 2013

(30) Foreign Application Priority Data

Mar. 30, 2012   (JP) ................. 2012-082938

(51) Int. Cl.
*B60L 9/00*     (2006.01)
*B60L 11/00*     (2006.01)
(Continued)

(52) U.S. Cl.
CPC . *B60L 15/20* (2013.01); *B60L 3/12* (2013.01); *B60L 7/16* (2013.01); *B60L 7/18* (2013.01); *B60L 11/12* (2013.01); *B60L 11/14* (2013.01); *B60L 15/2009* (2013.01); *B60L 15/2072* (2013.01); *B60L 2240/421* (2013.01);
(Continued)

(58) Field of Classification Search
CPC ............. B60L 15/20; B60L 3/12; B60L 7/16; B60L 11/12; B60L 11/14
USPC .......................................................... 701/22
See application file for complete search history.

(56) References Cited

U.S. PATENT DOCUMENTS

| 5,304,912 A | 4/1994 | Kajiwara et al. |
| 6,325,736 B1 | 12/2001 | Hamada et al. |

(Continued)

FOREIGN PATENT DOCUMENTS

| CN | 1535861 A | 10/2004 |
| CN | 1773293 A | 5/2006 |

(Continued)

OTHER PUBLICATIONS

Office Action dated Dec. 17, 2014, issued in corresponding Chinese Patent Application No. 201310102158.5, with Partial English Translation (20 pages).

*Primary Examiner* — Imran Mustafa
(74) *Attorney, Agent, or Firm* — Westerman, Hattori, Daniels & Adrian, LLP

(57) ABSTRACT

In a method of obtaining a rotation speed of a right wheel (RWr), the method includes: detecting a motor rotation speed detection value (LMa) using a resolver (20A); detecting a wheel rotation speed detection value (LWa) using a wheel speed sensor (13A); obtaining a ring gear rotation speed conversion value (Rb) based on the motor rotation speed detection value (LMa) and the wheel rotation speed detection value (LWa); detecting a motor rotation speed detection value (RMa) using the resolver (20B); obtaining a wheel rotation speed conversion value (RWb) based on the ring gear rotation speed conversion value (Rb) and the motor rotation speed detection value (RMa); detecting a wheel rotation speed detection value (RWa) using a wheel speed sensor (20B); and selecting the wheel rotation speed conversion value (RWb) or the wheel rotation speed detection value (RWa), whichever is greater, as the rotation speed of the right wheel (RWr).

5 Claims, 23 Drawing Sheets

(51) Int. Cl.
  *G05D 1/00*   (2006.01)
  *G05D 3/00*   (2006.01)
  *G06F 7/00*   (2006.01)
  *G06F 17/00*  (2006.01)
  *B60L 15/20*  (2006.01)
  *B60L 3/12*   (2006.01)
  *B60L 7/16*   (2006.01)
  *B60L 7/18*   (2006.01)
  *B60L 11/12*  (2006.01)
  *B60L 11/14*  (2006.01)

(52) U.S. Cl.
  CPC .......... *B60L2240/461* (2013.01); *Y02T 10/642* (2013.01); *Y02T 10/7077* (2013.01); *Y02T 10/7275* (2013.01)

(56) References Cited

U.S. PATENT DOCUMENTS

| | | | |
|---|---|---|---|
| 2009/0038866 A1* | 2/2009 | Abe et al. | 180/65.7 |
| 2012/0244992 A1* | 9/2012 | Hisada et al. | 477/5 |

FOREIGN PATENT DOCUMENTS

| | | | |
|---|---|---|---|
| CN | 1810557 A | 8/2006 | |
| CN | 101678776 A | 3/2010 | |
| CN | 101992769 A | 3/2011 | |
| JP | 63-023650 A | 1/1988 | |
| JP | 06-289039 A | 10/1994 | |
| JP | 09-079348 B2 | 3/1997 | |
| JP | 09079348 A1 * | 3/1997 | F16H 48/20 |
| JP | 3138799 B2 | 12/2000 | |
| JP | 2002-160541 A | 6/2002 | |

\* cited by examiner

FIG. 4

| VEHICLE STATE | FRONT UNIT | REAR UNIT | REAR MOTOR | OWC | BRK |
|---|---|---|---|---|---|
| STOP | × | × | STOP | OFF | OFF |
| FORWARD LOW-SPEED | × | ○ | POWER DRIVE | ON | ON (WEAK ENGAGEMENT) |
| FORWARD MIDDLE-SPEED | ○ | × | STOP | OFF | ON (WEAK ENGAGEMENT) |
| DECELERATION REGENERATION | ○ | ○ | REGENERATIVE DRIVE | OFF | ON |
| ACCELERATION | ○ | ○ | POWER DRIVE | ON | ON (WEAK ENGAGEMENT) |
| FORWARD HIGH-SPEED (WITH NO DRIVE REQUEST) | ○ | × | STOP | OFF | OFF |
| FORWARD HIGH-SPEED (WITH DRIVE REQUEST) | ○ | RING-FREE CONTROL | POWER DRIVE | OFF | OFF |
| BACKWARD | × | ○ | REVERSE POWER DRIVE | OFF | ON |

FORWARD HIGH-SPEED

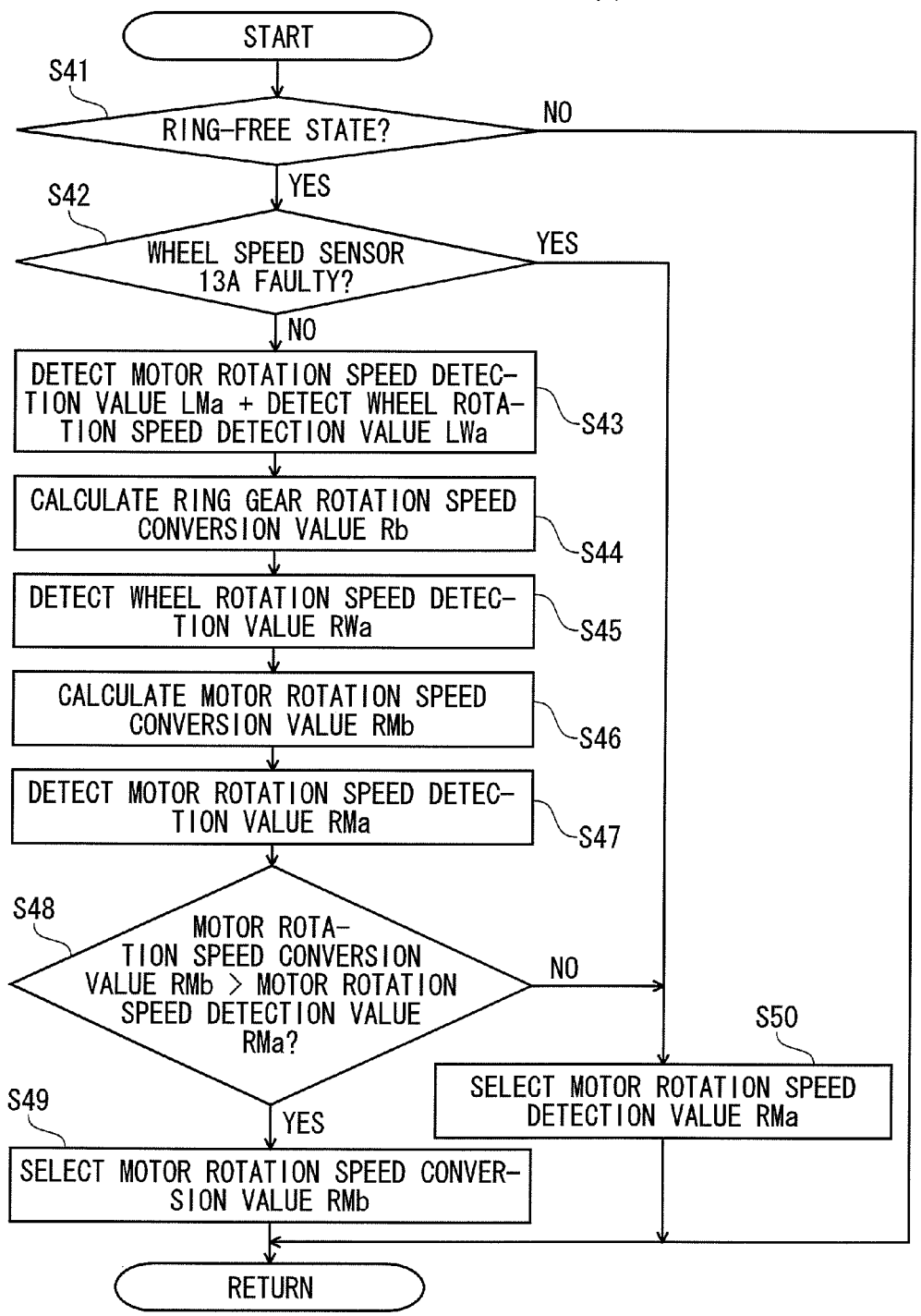

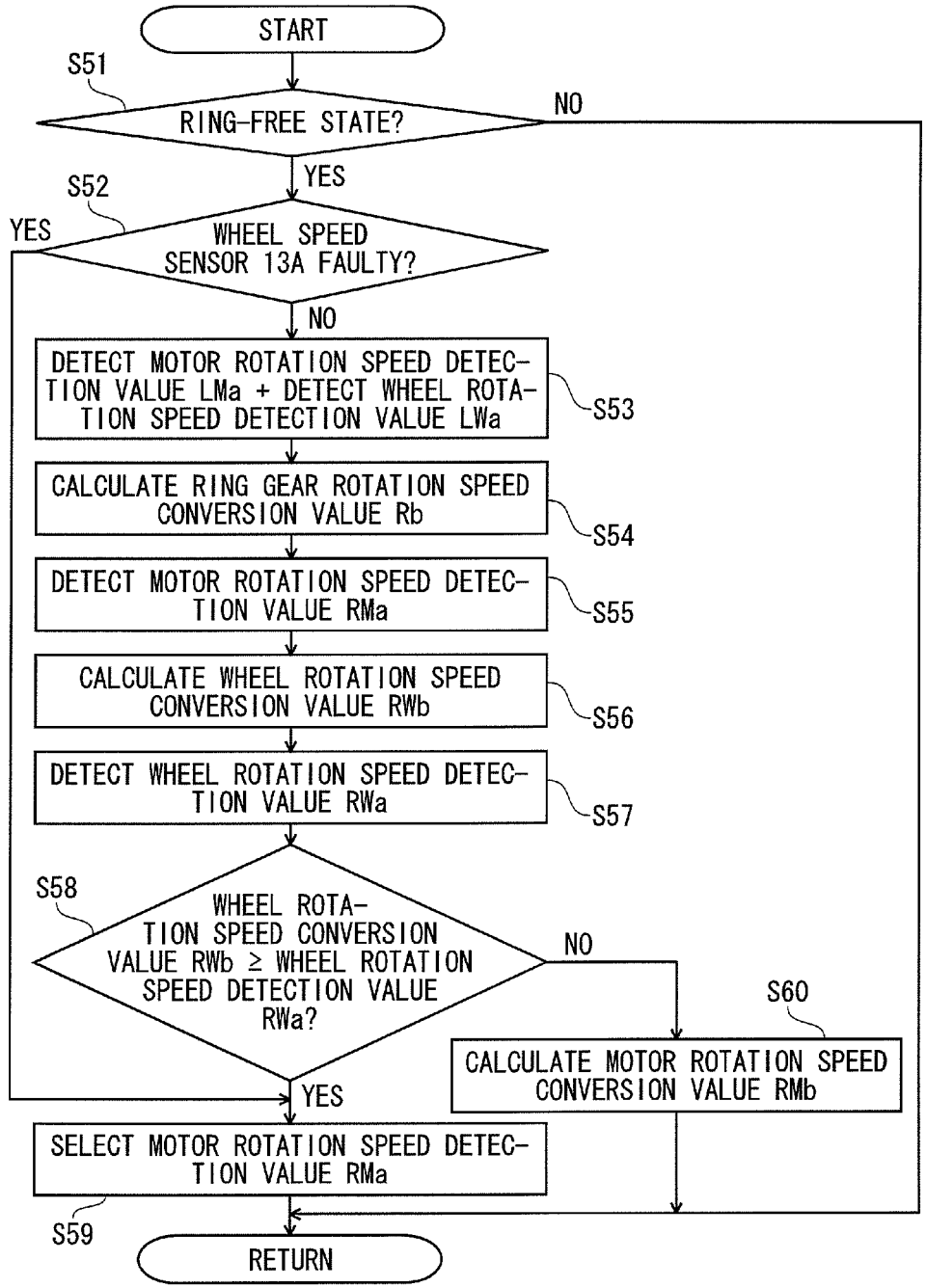

VEHICLE DRIVE DEVICE AND METHOD FOR CONTROLLING VEHICLE DRIVE DEVICE

CROSS-REFERENCE TO RELATED APPLICATION

This application claims priority from Japanese Patent Applications No. 2012-082938, filed on Mar. 30, 2012, the entire contents of which are herein incorporated by reference.

BACKGROUND

1. Technical Field

The present invention relates to a vehicle drive device provided with a left wheel drive unit for driving a left wheel and a right wheel drive unit for driving a right wheel and to a method for controlling the vehicle drive device.

2. Description of the Related Art

In Japanese Patent No. 3138799, a vehicle drive device is described which is equipped with a left wheel drive unit having a first electric motor for driving a left wheel of a vehicle and a first planetary gear transmission provided on the power transmission path between the first electric motor and the left wheel, and also equipped with a right wheel drive unit having a second electric motor for driving a right wheel of the vehicle and a second planetary gear transmission provided on the power transmission path between the second electric motor and the right wheel. In the first and second planetary gear transmissions, the first and second electric motors are respectively connected to the sun gears thereof, the left wheel and the right wheel are respectively connected to the planetary carriers thereof, and the ring gears thereof are connected to each other. Furthermore, the vehicle drive device is provided with braking means for braking the rotation of the ring gears by releasing or engaging the connected ring gears.

In the vehicle drive device configured as described above, it is described that start assist control is performed at the time of vehicle start by engaging braking means. Furthermore, it is also described that torque control is performed so that the torques generated by the first and second electric motors have directions opposite to each other with the braking means released after the start, whereby even when a yaw moment is exerted to the vehicle due to disturbance or the like, a moment opposed to this yaw moment is generated, and the straight traveling stability and the turning stability of the vehicle are improved.

Furthermore, JP-A-2002-160541 discloses a technology in which, in a vehicle that is driven such that wheels are driven by electric motors via drive axles and the connection between the drive axle and the electric motor is engaged/disengaged using a clutch, the clutch is engaged when the difference between the rotation speed of the electric motor detected using motor rotation speed detector for detecting the rotation speed of the electric motor and the rotation speed of the drive axle detected using drive axle rotation speed detector for detecting the rotation speed of the drive axle is less than a predetermined value, whereby shock caused by the engagement of the clutch is prevented.

However, in the vehicle drive device described in Japanese Patent No. 3138799, nothing is described with respect to countermeasures in the case that either the motor rotation speed detector or the drive axle rotation speed detector is faulty.

On the other hand, JP-A-63-23650 discloses a technology in which, in an automobile equipped with a wheel speed sensor for detecting the rotation speed of a wheel and a vehicle speed sensor for detecting the rotation speed of the power transmission system thereof, when a substantially large difference is present between the value detected by either one of the two sensors and the value detected by the other sensor, a judgment is made to determine whether either one of the two sensors is faulty.

In recent years, demands for energy saving and improvement in fuel efficiency, demands for improvement in comfort, etc. have been increasing, and the vehicle drive device described in Japanese Patent No. 3138799 also has room for improvement in controllability. In particular, in the case that the braking means operates to release the ring gears, the ring gears, sun gears (electric motors) and planetary carriers may become rotated simultaneously. However, nothing is described with respect to control to be performed at this time.

In this case, it may be conceivable that various types control are performed depending on the rotation speed of the electric motor and/or the rotation speed of the wheel, detected by the motor rotation speed detector and/or the drive axle rotation speed detector, by applying the technologies disclosed in JP-A-63-23650 and JP-A-2002-160541. In that case, even in the case that either one of the two means is judged to be faulty, it is desired that accurate control should be performed continuously. However, in this respect, nothing is disclosed with respect to the control to be performed after either one of the two sensors has been judged to be faulty in the technology described in JP-A-63-23650. The technology has, therefore, room for improvement in controllability.

SUMMARY OF THE INVENTION

It is one of objects of the present invention to provide a vehicle drive device excellent in controllability and a method for controlling the vehicle drive device.

According to a first aspect of the present invention, there is provided a vehicle drive device (for example, a rear wheel drive unit 1 according to an embodiment described later) comprising: a left wheel drive unit comprising: a first electric motor (for example, a first electric motor 2A according to the embodiment described later) that drives a left wheel (for example, a left rear wheel LWr according to the embodiment described later) of a vehicle (for example, a vehicle 3 according to the embodiment described later); and a first speed changer (for example, a first planetary gear reducer 12A according to the embodiment described later) disposed on a first power transmission path between the first electric motor and the left wheel, a right wheel drive unit comprising: a second electric motor (for example, a second electric motor 2B according to the embodiment described later) that drives a right wheel (for example, a right rear wheel RWr according to the embodiment described later) of the vehicle; and a second speed changer (for example, a second planetary gear reducer 12B according to the embodiment described later) disposed on a second power transmission path between the second electric motor and the right wheel, and an electric motor controller (for example, a controller 8 according to the embodiment described later) that controls the first electric motor and the second electric motor, wherein each of the first and second speed changers comprises first to third rotation elements (for example, sun gears 21A and 21B, planetary carriers 23A and 23B, and ring gears 24A and 24B according to the embodiment described later), the first electric motor is connected to the first rotation element of the first speed changer, the second electric motor is connected to the first rotation element of the second speed changer, the left wheel is connected to the second rotation element of the first speed changer, the right wheel is connected to the second rotation element of the second speed changer, the third rotation element of the first speed changer and the third rotation element of the second speed changer are connected to each other, wherein the vehicle drive device further comprises: a first rotation state amount detector (for example, a resolver 20A according to the embodiment described later) disposed to detect a first rotation state amount serving as a rotation state amount of the first electric motor or a rotation state amount of the first rotation element of the first speed changer; a second rotation state amount detector (for example, a wheel speed sensor 13A according to the embodiment described later) disposed to detect a second rotation state amount serving as a rotation state amount of the left wheel or a rotation state amount of the second rotation element of the first speed changer; a third rotation state amount detector (for example, a resolver 20B according to the embodiment described later) disposed to detect a third rotation state amount serving as a rotation state amount of the second electric motor or a rotation state amount of the first rotation element of the second speed changer; and a fourth rotation state amount detector (for example, a wheel speed sensor 13B according to the embodiment described later) disposed to detect a fourth rotation state amount serving as a rotation state amount of the right wheel or a rotation state amount of the second rotation element of the second speed changer, wherein the fourth rotation state amount is obtained using the following method (A) or (B):

(A) a rotation state amount of the third rotation element is obtained as a third rotation element rotation state amount conversion value (for example, a ring gear rotation speed conversion value Rb according to the embodiment described later) based on a first rotation state amount detection value (for example, a motor rotation speed detection value LMa according to the embodiment described later) detected using the first rotation state amount detector and a second rotation state amount detection value (for example, a wheel rotation speed detection value LWa according to the embodiment described later) detected using the second rotation state amount detector, and a fourth rotation state amount conversion value (for example, a wheel rotation speed conversion value RWb according to the embodiment described later) or a fourth rotation state amount detection value (for example, a wheel rotation speed detection value RWa according to the embodiment described later), whichever is greater, is used as the fourth rotation state amount, wherein the fourth rotation state amount conversion value serves as a rotation state amount at an installation position of the fourth rotation state amount detector and is obtained based on the third rotation element rotation state amount conversion value and a third rotation state amount detection value (a motor rotation speed detection value RMa according to the embodiment described later) detected using the third rotation state amount detector, wherein the fourth rotation state amount detection value is detected using the fourth rotation state amount detector, (B) the rotation state amount of the third rotation element is obtained as a third rotation element rotation state amount conversion value (for example, a ring gear rotation speed conversion value Rb according to the embodiment described later) based on a first rotation state amount detection value (for example, a motor rotation speed detection value LMa according to the embodiment described later) detected using the first rotation state amount detector and a second rotation state amount detection value (for example, a wheel rotation speed detection value LWa according to the embodiment described later) detected using the second rotation state amount detector, and when a third rotation state amount conversion value (for example, a motor rotation speed conversion value RMb according to the embodiment described later) serving as a rotation state amount at an installation position of the third rotation state amount detector and which is obtained based on the third rotation element rotation state amount conversion value and a fourth rotation state amount detection value (for example, a wheel rotation speed detection value RWa according to the embodiment described later) detected using the fourth rotation state amount detector is larger than a third rotation state amount detection value (for example, a motor rotation speed detection value RMa according to the embodiment described later) detected using the third rotation state amount detector, the fourth rotation state amount detection value is used as the fourth rotation state amount, and when the third rotation state amount conversion value is smaller than the third rotation state amount detection value, a fourth rotation state amount conversion value (for example, a wheel rotation speed conversion value RWb according to the embodiment described later) is used as the fourth rotation state amount, wherein the fourth rotation state amount conversion value serves as a rotation state amount at an installation position of the fourth rotation state amount detector and is obtained based on the third rotation element rotation state amount conversion value and the third rotation state amount detection value.

According to a second aspect of the present invention, the electric motor controller obtains a target fourth rotation state amount serving as a target rotation state amount of the fourth rotation state amount. When a difference between the target fourth rotation state amount and the fourth rotation state amount is equal to or more than a predetermined value, the controller controls the second electric motor such that the fourth rotation state amount becomes close to the target fourth rotation state amount.

According to a third aspect of the present invention, the vehicle drive device further comprises: a rotation restrictor (for example, hydraulic brakes 60A and 60B according to the embodiment described later) configured to lock the third rotation elements to restrict the rotation of the third rotation elements and to release the third rotation elements; and a rotation restrictor controller (for example, a controller 8 according to the embodiment described later) configured to control the rotation restrictor such that the rotation restrictor locks or releases the third rotation elements. The fourth rotation state amount is obtained using the method (A) or (B) when the rotation restrictor controller controls the rotation restrictor such that the rotation restrictor releases the third rotation elements.

According to a fourth aspect of the present invention, there is provided a vehicle drive device (for example, a rear wheel drive unit 1 according to an embodiment described later) comprising: a left wheel drive unit comprising: a first electric motor (for example, a first electric motor 2A according to the embodiment described later) that drives a left wheel (for example, a left rear wheel LWr according to the embodiment described later) of a vehicle (for example, a vehicle 3 according to the embodiment described later); and a first speed changer (for example, a first planetary gear reducer 12A according to the embodiment described later) disposed on a first power transmission path between the first electric motor and the left wheel, a right wheel drive unit comprising: a second electric motor (for example, a second electric motor 2B according to the embodiment described later) that drives a right wheel (for example, a right rear wheel RWr according to the embodiment described later) of the vehicle; and a second speed changer (for example, a second planetary gear reducer 12B according to the embodiment described later) disposed on a second power transmission path between the second electric motor and the right wheel, and an electric motor controller (for example, a controller 8 according to the embodiment described later) that controls the first electric motor and the second electric motor, wherein each of the first and second speed changers comprises first to third rotation elements (for example, sun gears 21A and 21B, planetary carriers 23A and 23B, and ring gears 24A and 24B according to the embodiment described later), the first electric motor is connected to the first rotation element of the first speed changer, the second electric motor is connected to the first rotation element of the second speed changer, the left wheel is connected to the second rotation element of the first speed changer, the right wheel is connected to the second rotation element of the second speed changer, the third rotation element of the first speed changer and the third rotation element of the second speed changer are connected to each other, wherein the vehicle drive device further comprises: a first rotation state amount detector (for example, a resolver 20A according to the embodiment described later) disposed to detect a first rotation state amount serving as a rotation state amount of the first electric motor or a rotation state amount of the first rotation element of the first speed changer; a second rotation state amount detector (for example, a wheel speed sensor 13A according to the embodiment described later) disposed to detect a second rotation state amount serving as a rotation state amount of the left wheel or a rotation state amount of the second rotation element of the first speed changer; a third rotation state amount detector (for example, a resolver 20B according to the embodiment described later) disposed to detect a third rotation state amount serving as a rotation state amount of the second electric motor or a rotation state amount of the first rotation element of the second speed changer; and a fourth rotation state amount detector (for example, a wheel speed sensor 13B according to the embodiment described later) disposed to detect a fourth rotation state amount serving as a rotation state amount of the right wheel or a rotation state amount of the second rotation element of the second speed changer, wherein the third rotation state amount is obtained using the following method (A) or (B):

(A) a rotation state amount of the third rotation element is obtained as a third rotation element rotation state amount conversion value (for example, a ring gear rotation speed conversion value Rb according to the embodiment described later) based on a first rotation state amount detection value (for example, a motor rotation speed detection value LMa according to the embodiment described later) detected using the first rotation state amount detector and a second rotation state amount detection value (for example, a wheel rotation speed detection value LWa according to the embodiment described later) detected using the second rotation state amount detector, and a third rotation state amount conversion value (for example, a motor rotation speed conversion value RMb according to the embodiment described later) or a third rotation state amount detection value (for example, a motor rotation speed detection value RMa according to the embodiment described later), whichever is greater, is used as the third rotation state amount, wherein the third rotation state amount conversion value serves as a rotation state amount at an installation position of the third rotation state amount detector and is obtained based on the third rotation element rotation state amount conversion value and the fourth rotation state amount detection value (for example, a wheel rotation speed detection value RWa according to the embodiment described later) detected using the fourth rotation state amount detector, wherein the third rotation state amount detection value is detected using the fourth rotation state amount detector, (B) the rotation state amount of the third rotation element is obtained as a third rotation element rotation state amount conversion value (for example, a ring gear rotation speed conversion value Rb according to the embodiment described later) based on a first rotation state amount detection value (for example, a motor rotation speed detection value LMa according to the embodiment described later) detected using the first rotation state amount detector and a second rotation state amount detection value (for example, a wheel rotation speed detection value LWa according to the embodiment described later) detected using the second rotation state amount detector, and when a fourth rotation state amount conversion value (for example, a wheel rotation speed conversion value RWb according to the embodiment described later) serving as a rotation state amount at an installation position of the fourth rotation state amount detector and which is obtained based on the third rotation element rotation state amount conversion value and a third rotation state amount detection value (for example, a motor rotation speed detection value RMa according to the embodiment described later) detected using the third rotation state amount detector is larger than a fourth rotation state amount detection value (for example, a wheel rotation speed detection value RWa according to the embodiment described later) detected using the fourth rotation state amount detector, the third rotation state amount detection value is used as the third rotation state amount, and when the fourth rotation state amount conversion value is smaller than the fourth rotation state amount detection value, a third rotation state amount conversion value (for example, a motor rotation speed conversion value RMb according to the embodiment described later) is used as the third rotation state amount, wherein the third rotation state amount conversion value serves as a rotation state amount at an installation position of the third rotation state amount detector and is obtained based on the third rotation element rotation state amount conversion value and the fourth rotation state amount detection value.

According to a fifth aspect of the present invention, the electric motor controller obtains a target third rotation state amount serving as a target rotation state amount of the third rotation state amount. When a difference between the target third rotation state amount and the third rotation state amount is equal to or more than a predetermined value, the controller controls the second electric motor such that the third rotation state amount becomes close to the target third rotation state amount.

According to a sixth aspect of the present invention, the vehicle drive device further comprises: a rotation restrictor (for example, hydraulic brakes 60A and 60B according to the embodiment described later) configured to lock the third rotation elements to restrict the rotation of the third rotation elements and to release the third rotation elements; and a rotation restrictor controller (for example, a controller 8 according to the embodiment described later) configured to control the rotation restrictor such that the rotation restrictor locks or releases the third rotation elements. The third rotation state amount is obtained using the method (A) or (B) when the rotation restrictor controller controls the rotation restrictor such that the rotation restrictor releases the third rotation elements.

According to a seventh aspect of the present invention, there is provided a method of controlling a vehicle drive device (for example, a rear wheel drive unit 1 according to an embodiment described later), wherein the vehicle drive device comprises: a left wheel drive unit comprising: a first electric motor (for example, a first electric motor 2A according to the embodiment described later) that drives a left wheel (for example, a left rear wheel LWr according to the embodiment described later) of a vehicle (for example, a vehicle 3 according to the embodiment described later); and a first speed changer (for example, a first planetary gear reducer 12A according to the embodiment described later) disposed on a first power transmission path between the first electric motor and the left wheel, a right wheel drive unit comprising: a second electric motor (for example, a second electric motor 2B according to the embodiment described later) that drives a right wheel (for example, a right rear wheel RWr according to the embodiment described later) of the vehicle; and a second speed changer (for example, a second planetary gear reducer 12B according to the embodiment described later) disposed on a second power transmission path between the second electric motor and the right wheel, and an electric motor controller (for example, a controller 8 according to the embodiment described later) that controls the first electric motor and the second electric motor, wherein each of the first and second speed changers comprises first to third rotation elements (for example, sun gears 21A and 21B, planetary carriers 23A and 23B, and ring gears 24A and 24B according to the embodiment described later), the first electric motor is connected to the first rotation element of the first speed changer, the second electric motor is connected to the first rotation element of the second speed changer, the left wheel is connected to the second rotation element of the first speed changer, the right wheel is connected to the second rotation element of the second speed changer, the third rotation element of the first speed changer and the third rotation element of the second speed changer are connected to each other, wherein the vehicle drive device further comprises: a first rotation state amount detector (for example, a resolver 20A according to the embodiment described later) disposed to detect a first rotation state amount serving as a rotation state amount of the first electric motor or a rotation state amount of the first rotation element of the first speed changer; a second rotation state amount detector (for example, a wheel speed sensor 13A according to the embodiment described later) disposed to detect a second rotation state amount serving as a rotation state amount of the left wheel or a rotation state amount of the second rotation element of the first speed changer; a third rotation state amount detector (for example, a resolver 20B according to the embodiment described later) disposed to detect a third rotation state amount serving as a rotation state amount of the second electric motor or a rotation state amount of the first rotation element of the second speed changer; and a fourth rotation state amount detector (for example, a wheel speed sensor 13B according to the embodiment described later) disposed to detect a fourth rotation state amount serving as a rotation state amount of the right wheel or a rotation state amount of the second rotation element of the second speed changer. The method comprises obtaining the fourth rotation state amount using the following method (A) or (B).

The method (A) comprises:

a first detection step of detecting a first rotation state amount detection value (for example, a motor rotation speed detection value LMa according to the embodiment described later) using the first rotation state amount detector, a second detection step of detecting a second rotation state amount detection value (for example, a wheel rotation speed detection value LWa according to the embodiment described later) using the second rotation state amount detector, a first conversion step of obtaining a third rotation element rotation state amount conversion value (for example, a ring gear rotation speed conversion value Rb according to the embodiment described later) based on the first rotation state amount detection value and a second rotation state amount detection value, a third detection step of detecting a third rotation state amount detection value (for example, a motor rotation speed detection value RMa according to the embodiment described later) using the third rotation state amount detector, a second conversion step of obtaining a fourth rotation state amount conversion value (for example, a wheel rotation speed conversion value RWb according to the embodiment described later) serving as a rotation state amount at an installation position of the fourth rotation state amount detector, based on the third rotation element rotation state amount conversion value and the third rotation state amount detection value, a fourth detection step of detecting a fourth rotation state amount detection value (for example, a wheel rotation speed detection value RWa according to the embodiment described later) using the fourth rotation state amount detector, and a wheel rotation speed selection step of selecting the fourth rotation state amount conversion value or the fourth rotation state amount detection value, whichever is greater, as the fourth rotation state amount.

The method (B) comprises:

a first detection step of detecting a first rotation state amount detection value (for example, a motor rotation speed detection value LMa according to the embodiment described later) using the first rotation state amount detector, a second detection step of detecting a second rotation state amount detection value (for example, a wheel rotation speed detection value LWa according to the embodiment described later) using the second rotation state amount detector, a first conversion step of obtaining a third rotation element rotation state amount conversion value (for example, a ring gear rotation speed conversion value Rb according to the embodiment described later) based on the first rotation state amount detection value and the second rotation state amount detection value, a third detection step of detecting a fourth rotation state amount detection value (for example, a wheel rotation speed detection value RWa according to the embodiment described later) using the fourth rotation state amount detector, a second conversion step of obtaining a third rotation state amount conversion value (for example, a motor rotation speed conversion value RMb according to the embodiment described later) serving as a rotation state amount at an installation position of the third rotation state amount detector, based on the third rotation element rotation state amount conversion value and the fourth rotation state amount detection value, a fourth detection step of detecting a third rotation state amount detection value (for example, a motor rotation speed detection value RMa according to the embodiment described later) using the third rotation state amount detector, a wheel rotation speed selection step of selecting the fourth rotation state amount detection value as the fourth rotation state amount when the third rotation state amount conversion value is larger than the third rotation state amount detection value, a third conversion step of obtaining a fourth rotation state amount conversion value (for example, a wheel rotation speed conversion value RWb according to the embodiment described later) serving as a rotation state amount at an installation position of the fourth rotation state amount detector, based on the third rotation element rotation state amount conversion value and the third rotation state amount detection value, and a wheel rotation speed selection step of selecting the fourth rotation state amount conversion value as the fourth rotation state amount when the third rotation state amount conversion value is smaller than the third rotation state amount detection value.

According to an eighth aspect of the present invention, there is provided a method of controlling a vehicle drive device (for example, a rear wheel drive unit 1 according to an embodiment described later), wherein the vehicle drive device comprises: a left wheel drive unit comprising: a first electric motor (for example, a first electric motor 2A according to the embodiment described later) that drives a left wheel (for example, a left rear wheel LWr according to the embodiment described later) of a vehicle (for example, a vehicle 3 according to the embodiment described later); and a first speed changer (for example, a first planetary gear reducer 12A according to the embodiment described later) disposed on a first power transmission path between the first electric motor and the left wheel, a right wheel drive unit comprising: a second electric motor (for example, a second electric motor 2B according to the embodiment described later) that drives a right wheel (for example, a right rear wheel RWr according to the embodiment described later) of the vehicle; and a second speed changer (for example, a second planetary gear reducer 12B according to the embodiment described later) disposed on a second power transmission path between the second electric motor and the right wheel, and an electric motor controller (for example, a controller 8 according to the embodiment described later) that controls the first electric motor and the second electric motor, wherein each of the first and second speed changers comprises first to third rotation elements (for example, sun gears 21A and 21B, planetary carriers 23A and 23B, and ring gears 24A and 24B according to the embodiment described later), the first electric motor is connected to the first rotation element of the first speed changer, the second electric motor is connected to the first rotation element of the second speed changer, the left wheel is connected to the second rotation element of the first speed changer, the right wheel is connected to the second rotation element of the second speed changer, the third rotation element of the first speed changer and the third rotation element of the second speed changer are connected to each other, wherein the vehicle drive device further comprises: a first rotation state amount detector (for example, a resolver 20A according to the embodiment described later) disposed to detect a first rotation state amount serving as a rotation state amount of the first electric motor or a rotation state amount of the first rotation element of the first speed changer; a second rotation state amount detector (for example, a wheel speed sensor 13A according to the embodiment described later) disposed to detect a second rotation state amount serving as a rotation state amount of the left wheel or a rotation state amount of the second rotation element of the first speed changer; a third rotation state amount detector (for example, a resolver 20B according to the embodiment described later) disposed to detect a third rotation state amount serving as a rotation state amount of the second electric motor or a rotation state amount of the first rotation element of the second speed changer; and a fourth rotation state amount detector (for example, a wheel speed sensor 13B according to the embodiment described later) disposed to detect a fourth rotation state amount serving as a rotation state amount of the right wheel or a rotation state amount of the second rotation element of the second speed changer. The method comprises obtaining the third rotation state amount using the following method (A) or (B).

The method (A) comprises:

a first detection step of detecting a first rotation state amount detection value (for example, a motor rotation speed detection value LMa according to the embodiment described later) using the first rotation state amount detector, a second detection step of detecting a second rotation state amount detection value (for example, a wheel rotation speed detection value LWa according to the embodiment described later) using the second rotation state amount detector, a first conversion step of obtaining a third rotation element rotation state amount conversion value (for example, a ring gear rotation speed conversion value Rb according to the embodiment described later) based on the first rotation state amount detection value and a second rotation state amount detection value, a third detection step of detecting a fourth rotation state amount detection value (for example, a wheel rotation speed detection value RWa according to the embodiment described later) using the fourth rotation state amount detector, a second conversion step of obtaining a third rotation state amount conversion value (for example, a motor rotation speed conversion value RMb according to the embodiment described later) serving as a rotation state amount at an installation position of the third rotation state amount detector, based on the third rotation element rotation state amount conversion value and the fourth rotation state amount detection value, a fourth detection step of detecting a third rotation state amount detection value (for example, a motor rotation speed detection value RMa according to the embodiment described later) using the third rotation state amount detector, a motor rotation speed selection step of selecting the third rotation state amount conversion value or the third rotation state amount detection value, whichever is greater, as the third rotation state amount.

The method (B) comprises:

a first detection step of detecting a first rotation state amount detection value (for example, a motor rotation speed detection value LMa according to the embodiment described later) using the first rotation state amount detector, a second detection step of detecting a second rotation state amount detection value (for example, a wheel rotation speed detection value LWa according to the embodiment described later) using the second rotation state amount detector, a first conversion step of obtaining a third rotation element rotation state amount conversion value (for example, a ring gear rotation speed conversion value Rb according to the embodiment described later) based on the first rotation state amount detection value and the second rotation state amount detection value, a third detection step of detecting a third rotation state amount detection value (for example, a motor rotation speed detection value RMa according to the embodiment described later) using the third rotation state amount detector, a second conversion step of obtaining a fourth rotation state amount conversion value (for example, a wheel rotation speed conversion value RWb according to the embodiment described later) serving as a rotation state amount at an installation position of the fourth rotation state amount detector, based on the third rotation element rotation state amount conversion value and the third rotation state amount detection value, a fourth detection step of detecting a fourth rotation state amount detection value (for example, a wheel rotation speed detection value RWa according to the embodiment described later) using the fourth rotation state amount detector, a motor rotation speed selection step of selecting the third rotation state amount detection value as the third rotation state amount, when the fourth rotation state amount conversion value is larger than the fourth rotation state amount detection value, a third conversion step of obtaining a third rotation state amount conversion value (for example, a motor rotation speed conversion value RMb according to the embodiment described later) serving as a rotation state amount at an installation position of the third rotation state amount detector, based on the third rotation element rotation state amount conversion value and the fourth rotation state amount detection value, and a motor rotation speed selection step of selecting the third rotation state amount conversion value as the third rotation state amount when the fourth rotation state amount conversion value is smaller than the fourth rotation state amount detection value.

According to the first and seventh aspects of the present invention, the third rotation element of the first speed changer and the third rotation element of the second speed changer are connected to each other, whereby the fourth rotation state amount can be obtained using the first to fourth rotation state amount detector, and various types of control for performing control using the fourth rotation state amount can be improved in robustness. Furthermore, even if any one of the first to fourth state amount detector is faulty, normal control can be continued.

According to the second aspect of the present invention, the second electric motor is subjected to traction control based on the obtained fourth rotation state amount, whereby the right wheel is suppressed from slipping (idling).

According to the third aspect of the present invention, the fourth rotation state amount can be obtained even in the case that the third rotation element is in its released state.

According to the fourth and eighth aspects of the present invention, the third rotation element of the first speed changer and the third rotation element of the second speed changer are connected to each other, whereby the third rotation state amount can be obtained using the first to fourth rotation state amount detector, and various types of control for performing control using the third rotation state amount can be improved in robustness. Furthermore, even if any one of the first to fourth state amount detector is faulty, normal control can be continued.

According to the fifth aspect of the present invention, the second electric motor is subjected to traction control based on the obtained third rotation state amount, whereby the right wheel is suppressed from slipping (idling).

According to the sixth aspect of the present invention, the third rotation state amount can be obtained even in the case that the third rotation element is in its released state.

BRIEF DESCRIPTION OF THE DRAWINGS

FIG. 4 is a table showing the relationship between the front wheel drive unit and the rear wheel drive unit in various vehicle states and also showing the operation states of electric motors;

FIG. 22 is a chart showing the control flow of motor rotation speed obtaining control (A); and FIG. 23 is a chart showing the control flow of motor rotation speed obtaining control (B).

DETAILED DESCRIPTION OF EXEMPLARY EMBODIMENTS

First, an embodiment of a vehicle drive device according to the present invention will be described based on FIGS. 1 to 3.

Figure 1:
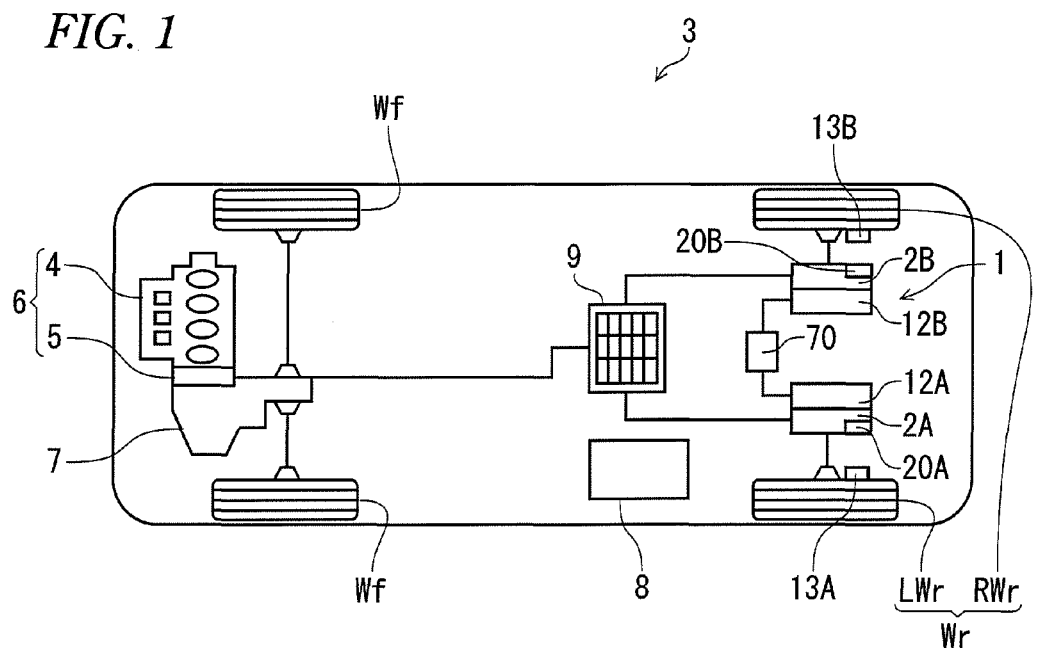
FIG. 1 is a block diagram showing a schematic configuration of a hybrid vehicle according to an embodiment of a vehicle on which a vehicle drive device according to the present invention can be mounted.

The vehicle drive device according to the present invention, in which electric motors serve as drive sources for driving axles, is used for a vehicle having such a drive system shown in FIG. 1, for example. In the following descriptions, a case in which the vehicle drive device is used to drive rear wheels is taken as an example. However, the vehicle drive device may also be used to drive front wheels.

The vehicle 3 shown in FIG. 1 is a hybrid vehicle having a drive unit 6 (hereafter referred to as a front wheel drive unit) including an internal combustion engine 4 and an electric motor 5 connected in series at the front section of the vehicle, and the drive power of this front wheel drive unit 6 is transmitted to front wheels Wf via a transmission 7; on the other hand, the drive power of a drive unit 1 (hereafter referred to as a rear wheel drive unit) provided at the rear section of the vehicle and separated from the front wheel drive unit 6 is transmitted to rear wheels Wr (RWr and LWr). The electric motor 5 of the front wheel drive unit 6 and the first and second electric motors 2A and 2B of the rear wheel drive unit 1 on the sides of the rear wheels Wr are connected to a battery 9, and electric power supply from the battery 9 and energy regeneration to the battery 9 can be performed. Numeral 8 designates a controller for variously controlling the entire vehicle.

Figure 2:
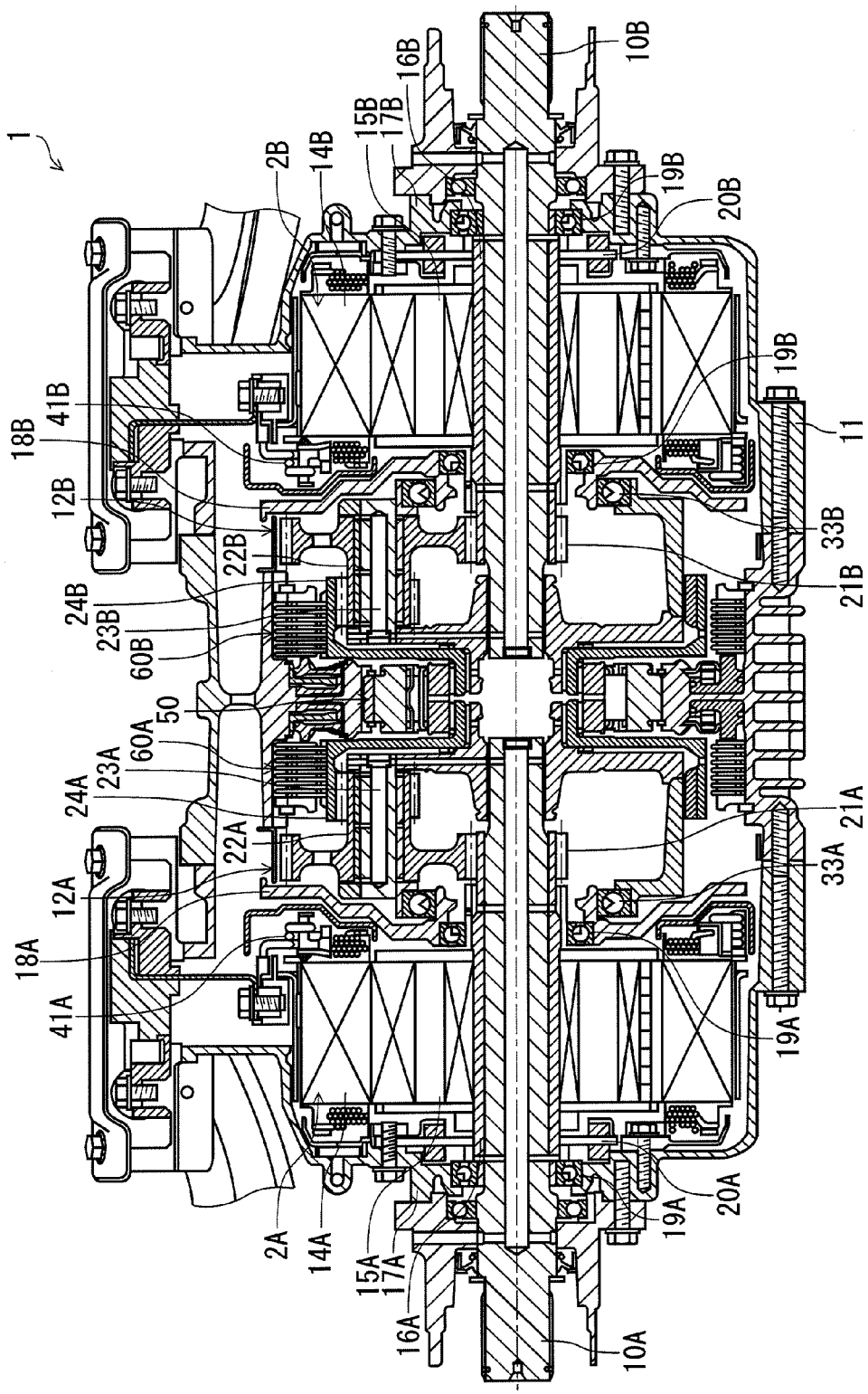
FIG. 2 is a vertical sectional view showing an embodiment of a rear wheel drive unit.
Figure 3:
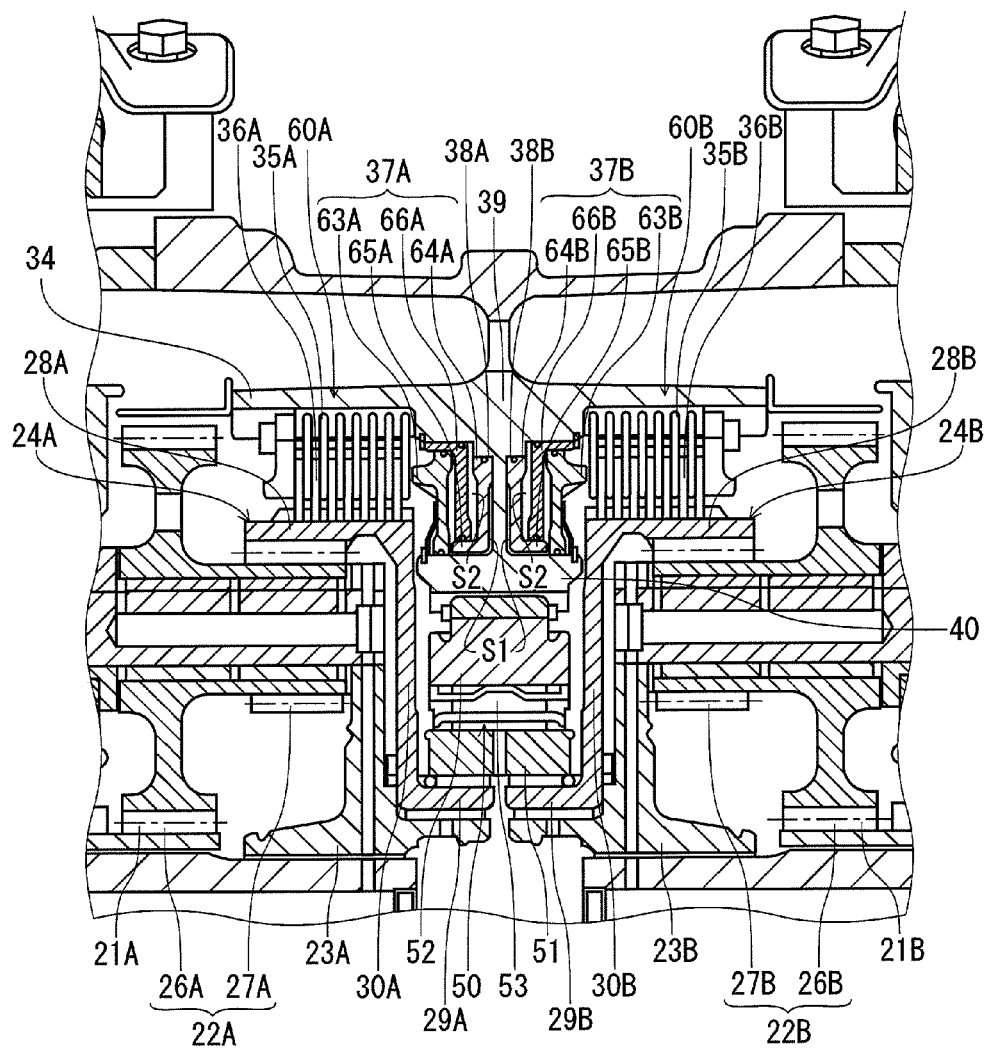
FIG. 3 is a fragmentary enlarged view showing the rear wheel drive unit shown in FIG. 2.

FIG. 2 is a vertical sectional view showing the whole structure of the rear wheel drive unit 1. In the figure, 10A and 10B designate left and right axles on the sides of the rear wheels Wr of the vehicle 3, and these axles are disposed coaxially in the width direction of the vehicle. The reducer case 11 of the rear wheel drive unit 1 is wholly formed into an approximately cylindrical shape, and in the interior thereof, the first and second electric motors 2A and 2B for driving the axles and first and second planetary gear reducers 12A and 12B for reducing the drive rotation speeds of the first and second electric motors 2A and 2B are disposed coaxially with the axles 10A and 10B. The first electric motor 2A and the first planetary gear reducer 12A function as a left wheel drive unit for driving the left rear wheel LWr, and the second electric motor 2B and the second planetary gear reducer 12B function as a right wheel drive unit for driving the right rear wheel RWr. The first electric motor 2A and the first planetary gear reducer 12A and the second electric motor 2B and the second planetary gear reducer 12B are disposed so as to be left-right symmetric in the width direction of the vehicle inside the reducer case 11. The rear wheels Wr are provided with wheel speed sensors 13A and 13B for detecting the rotation speeds of the left rear wheel LWr and the right rear wheel RWr. These wheel speed sensors 13A and 13B function as second and fourth rotation state amount detector according to the present invention.

The stators 14A and 14B of the first and second electric motors 2A and 2B are secured to the left and right end side interiors of the reducer case 11, respectively, and ring-shaped rotors 15A and 15B are rotatably disposed on the inner circumferential sides of the stators 14A and 14B. Cylindrical shafts 16A and 16B enclosing the outer circumferences of the axles 10A and 10B are connected to the inner circumferential sections of the rotors 15A and 15B, and these cylindrical shafts 16A and 16B are supported by the end walls 17A and 17B and the intermediate walls 18A and 18B of the reducer case 11 via bearings 19A and 19B so as to be coaxial with the axles 10A and 10B and relatively rotatable therewith. Furthermore, resolvers 20A and 20B for feeding back the rotation position information of the rotors 15A and 15B to the controller (not shown) of the first and second electric motors 2A and 2B are provided on the outer circumferences on one end sides of the cylindrical shafts 16A and 16B and on the end walls 17A and 17B of the reducer case 11. These resolvers 20A and 20B function as first and third rotation state amount detector according to the present invention.

Moreover, the first and second planetary gear reducers 12A and 12B include sun gears 21A and 21B, pluralities of planetary gears 22A and 22B engaged with the sun gears 21A and 21B, planetary carriers 23A and 23B for supporting these planetary gears 22A and 22B, and ring gears 24A and 24B engaged with the outer circumferential sides of the planetary gears 22A and 22B, wherein the drive power of the first and second electric motors 2A and 2B is input from the sun gears 21A and 21B and the drive power obtained after speed reduction is output via the planetary carriers 23A and 23B.

The sun gears 21A and 21B are integrated with the cylindrical shafts 16A and 16B. In addition, as shown in FIG. 3, for example, the planetary gears 22A and 22B are duplex pinions having large-diameter first pinions 26A and 26B directly engaged with the sun gears 21A and 21B and small-diameter second pinions 27A and 27B being smaller in diameter than the first pinions 26A and 26B, and the first pinions 26A and 26B and the second pinions 27A and 27B are integrated so as to be coaxial and offset in the axial direction. The planetary gears 22A and 22B are supported by the planetary carriers 23A and 23B, and the axially inner end sections of the planetary carriers 23A and 23B are extended inward in the radial direction, spline-fitted in the axles 10A and 10B and supported so as to be integrally rotatable and also supported by the intermediate walls 18A and 18B via bearings 33A and 33B.

The intermediate walls 18A and 18B are configured so as to separate electric motor accommodating spaces for accommodating the first and second electric motors 2A and 2B from reducer spaces for accommodating the first and second planetary gear reducers 12A and 12B and so as to be curved so that the mutual axial distances therebetween are increased from the outer diameter sides to the inner diameter sides thereof. Furthermore, the bearings 33A and 33B for supporting the planetary carriers 23A and 23B are disposed on the inner diameter sides of the intermediate walls 18A and 18B and on the sides of the first and second planetary gear reducers 12A and 12B. Moreover, bus rings 41A and 41B for the stators 14A and 14B are disposed on the outer diameter sides of the intermediate walls 18A and 18B and on the sides of the first and second electric motors 2A and 2B (see FIG. 2).

The ring gears 24A and 24B include gear sections 28A and 28B, the inner circumferential faces of which are engaged with the small-diameter second pinions 27A and 27B; small-diameter sections 29A and 29B being smaller in diameter than the gear sections 28A and 28B and disposed so as to be opposed to each other at the intermediate position of the reducer case 11; and connection sections 30A and 30B for connecting the axially inner end sections of the gear sections 28A and 28B to the axially outer end sections of the small-diameter sections 29A and 29B in the radial direction. In this embodiment, the maximum radius of the ring gears 24A and 24B is set so as to be smaller than the maximum distance of the first pinions 26A and 26B from the center of the axles 10A and 10B. The small-diameter sections 29A and 29B are respectively spline-fitted in the inner race 51 of a one-way clutch 50 described later, and the ring gears 24A and 24B are configured so as to be rotated integrally with the inner race 51 of the one-way clutch 50.

Cylindrical space sections are securely obtained between the reducer case 11 and the ring gears 24A and 24B, and hydraulic brakes 60A and 60B for locking or releasing the ring gears 24A and 24B to restrict the rotation of the ring gears 24A and 24B are disposed inside the space sections so as to overlap the first pinions 26A and 26B in the radial direction and to overlap the second pinions 27A and 27B in the axial direction. In the hydraulic brakes 60A and 60B, pluralities of stationary plates 35A and 35B spline-fitted in the inner circumferential face of a cylindrical outer diameter side support section 34 extending in the axial direction on the inner diameter side of the reducer case 11 and plural rotation plates 36A and 36B spline-fitted in the outer circumferential faces of the ring gears 24A and 24B are disposed alternately in the axial direction, and these plates 35A, 35B, 36A and 36B are engaged and released to each other by ring-shaped pistons 37A and 37B. The pistons 37A and 37B are accommodated so as to be advanced and retracted in ring-shaped cylinder chambers 38A and 38B formed between a left-right partition wall 39 extended from the intermediate position of the reducer case 11 to the inner diameter side thereof and the outer diameter side support section 34 and an inner diameter side support section 40 connected by the left-right partition wall 39, wherein the pistons 37A and 37B are advanced by introducing high-pressure oil into the cylinder chambers 38A and 38B and retracted by discharging the oil from the cylinder chambers 38A and 38B. The hydraulic brakes 60A and 60B are connected to an electric oil pump 70 (see FIG. 1).

Furthermore, in more detail, the pistons 37A and 37B have first piston walls 63A and 63B and second piston walls 64A and 64B in the axial front-rear direction, and these piston walls 63A, 63B, 64A and 64B are connected by cylindrical inner circumferential walls 65A and 65B. Hence, ring-shaped spaces being open outward in the radial direction are formed between the first piston walls 63A and 63B and the second piston walls 64A and 64B, and the ring-shaped spaces are partitioned in the axial left-right direction by partition members 66A and 66B secured to the inner circumferential faces of the outer walls of the cylinder chambers 38A and 38B. The spaces between left-right partition wall 39 of the reducer case 11 and the second piston walls 64A and 64B are used as first actuation chambers S1 into which high-pressure oil is introduced directly, and the spaces between the partition members 66A and 66B and the first piston walls 63A and 63B are used as second actuation chambers S2 communicating with the first actuation chambers S1 via through holes formed in the inner circumferential walls 65A and 65B. The spaces between the second piston walls 64A and 64B and the partition members 66A and 66B communicate with the atmosphere.

In the hydraulic brakes 60A and 60B, oil is introduced into the first actuation chambers S1 and the second actuation chambers S2 from a hydraulic circuit, not shown, and the stationary plates 35A and 35B and the rotation plates 36A and 36B can be pressed against each other by the oil pressure acting on the first piston walls 63A and 63B and the second piston walls 64A and 64B. Hence, large pressure-receiving areas can be obtained by the first and second piston walls 63A, 63B, 64A and 64B in the axial left-right direction, whereby large press forces for the stationary plates 35A and 35B and the rotation plates 36A and 36B can be obtained while the radial areas of the pistons 37A and 37B are suppressed.

In the case of the hydraulic brakes 60A and 60B, the stationary plates 35A and 35B are supported by the outer diameter side support section 34 extended from the reducer case 11, and the rotation plates 36A and 36B are supported by the ring gears 24A and 24B. Hence, when the plates 35A and 36A and the plates 35B and 36B are pressed by the pistons 37A and 37B, braking forces are applied to lock the ring gears 24A and 24B by the frictional engagement between the plates 35A and 36A and between the plates 35B and 36B. When the engagement by the pistons 37A and 37B is released from the state, the ring gears 24A and 24B are allowed to rotate freely.

In other words, at the time of the engagement, the hydraulic brakes 60A and 60B lock the ring gears 24A and 24B, whereby the power transmission path between the first and second electric motors 2A and 2B and the rear wheels Wr is set to a connection state in which power transmission is possible. At the time of the releasing, the ring gears 24A and 24B are allowed to rotate, and the power transmission path between the first and second electric motors 2A and 2B and the rear wheels Wr is set to a disconnection state in which power transmission is impossible.

Furthermore, a space section is securely obtained between the connection sections 30A and 30B of the ring gears 24A and 24B opposed in the axial direction, and the one-way clutch 50 for transmitting the drive power to the ring gears 24A and 24B in only one direction and for shutting off the transmission of the drive power in the other direction is disposed in the space section. The one-way clutch 50 is formed of a plurality of sprags 53 interposed between the inner race 51 and the outer race 52 thereof, and the inner race 51 is configured so as to be integrally rotated with the small-diameter sections 29A and 29B of the ring gears 24A and 24B by virtue of spline fitting. In other words, the ring gear 24A and the ring gear 24B are connected to each other by the inner race 51 so as to be integrally rotatable. Moreover, the outer race 52 is positioned by the inner diameter side support section 40 and prevented from being rotated. When the vehicle 3 travels forward by virtue of the drive power of the first and second electric motors 2A and 2B, the one-way clutch 50 is configured so as to engage, thereby locking the rotations of the ring gears 24A and 24B. More specifically, the one-way clutch 50 is held in its engaged state when the torques in the forward direction (the rotation direction when the vehicle 3 is moved forward) on the sides of the first and second electric motors 2A and 2B are input to the rear wheels Wr. The one-way clutch 50 is held in its disengaged state when the torques in the reverse direction on the sides of the first and second electric motors 2A and 2B are input to the rear wheels Wr. Furthermore, the one-way clutch 50 is held in its disengaged state when the torques in the forward direction on the sides of the rear wheels Wr are input to the first and second electric motors 2A and 2B, and the one-way clutch 50 is held in its engaged state when the torques in the reverse direction on the sides of the rear wheels Wr are input to the first and second electric motors 2A and 2B. In other words, at the time of the disengagement, the one-way clutch 50 allows the ring gears 24A and 24B to be rotated in one direction by the reversely-oriented torques of the first and second electric motors 2A and 2B. At the time of the engagement, the one-way clutch 50 restricts the ring gears 24A and 24B from being rotated in the reverse direction by the forwardly-oriented torques of the first and second electric motors 2A and 2B. The reversely-oriented torque is the torque acting in the reverse direction in which the rotation in the reverse direction is increased or the torque acting in the reverse direction in which the rotation in the forward direction is decreased.

As described above, in the rear wheel drive unit 1 according to this embodiment, the one-way clutch 50 and the hydraulic brakes 60A and 60B are provided in parallel on the power transmission paths between the first and second electric motors 2A and 2B and the rear wheels Wr. Both the hydraulic brakes 60A and 60B are not necessarily required to be provided. One hydraulic brake may be provided in one space and the other space may be used as a breather chamber.

The controller 8 (see FIG. 1) is a controller for variously controlling the entire vehicle. The speed sensor values of the wheels, the motor rotation speed sensor values of the first and second electric motors 2A and 2B, the steering angle of the steering wheel, the opening AP of the accelerator pedal, the position of the shift, the charged state (SOC) of the battery 9, oil temperature, etc. are input to the controller 8. On the other hand, signals for controlling the internal combustion engine 4, signals for controlling the first and second electric motors 2A and 2B, signals for controlling the hydraulic brakes 60A and 60B, signals for controlling the electric oil pump 70, etc. are output from the controller 8.

In other words, the controller 8 is equipped with at least a function of serving as an electric motor controller for controlling the first and second electric motors 2A and 2B and a function of serving as a rotation restrictor controller for performing control so that the hydraulic brakes 60A and 60B are set to their released state or engaged state.

FIG. 4 is a view showing the relationship between the front wheel drive unit 6 and the rear wheel drive unit 1 in various vehicle states and also showing the operation states of the first and second electric motors 2A and 2B. In the figure, "front unit" designates the front wheel drive unit 6, "rear unit" designates the rear wheel drive unit 1, "rear motor" designates the first and second electric motors 2A and 2B, "OWC" designates the one-way clutch 50, and "BRK" designates the hydraulic brakes 60A and 60B. In addition, FIGS. 5 to 10 and FIGS. 12 to 17 are speed alignment charts in various states of the rear wheel drive unit 1. "LMOT" designates the first electric motor 2A and "RMOT" designates the second electric motor 2B. "S", "C" and "PG" on the left side designate the sun gear 21A of the first planetary gear reducer 12A connected to the first electric motor 2A, the planetary carrier 23A of the first planetary gear reducer 12A and the planetary gear 22B of the second planetary gear reducer 12B, respectively. "S", "C" and "PG" on the right side designate the sun gear 21B of the second planetary gear reducer 12B, the planetary carrier 23B of the second planetary gear reducer 12B and the planetary gear 22A of the first planetary gear reducer 12A. "R" designates the ring gears 24A and 24B of the first and second planetary gear reducers 12A and 12B, "BRK" designates the hydraulic brakes 60A and 60B, and "OWC" designates the one-way clutch 50. In the following descriptions, the rotation direction of the sun gears 21A and 21B at the time of forward travel of the vehicle using the first and second electric motors 2A and 2B is assumed to be the forward direction. In addition, in each figure, the upper portion thereof represents the rotation in the forward direction from the stop state of the vehicle and the lower portion thereof represents the rotation in the reverse direction. Furthermore, an upward arrow indicates a torque in the forward direction and a downward arrow indicates a torque in the reverse direction.

Figure 5:
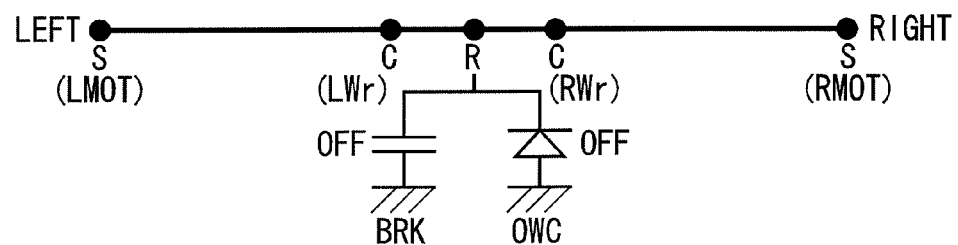
FIG. 5 is a speed alignment chart for the rear wheel drive unit at the stop time of the vehicle.

At the stop time of the vehicle, the front wheel drive unit 6 and the rear wheel drive unit 1 do not perform driving. Hence, as shown in FIG. 5, the first and second electric motors 2A and 2B of the rear wheel drive unit 1 are stopped, and the axles 10A and 10B are also stopped, whereby no torque is applied to these components. At this time, the hydraulic brakes 60A and 60B are released (OFF). Furthermore, the one-way clutch 50 is not engaged (OFF) because the first and second electric motors 2A and 2B are not driven.

Figure 6:
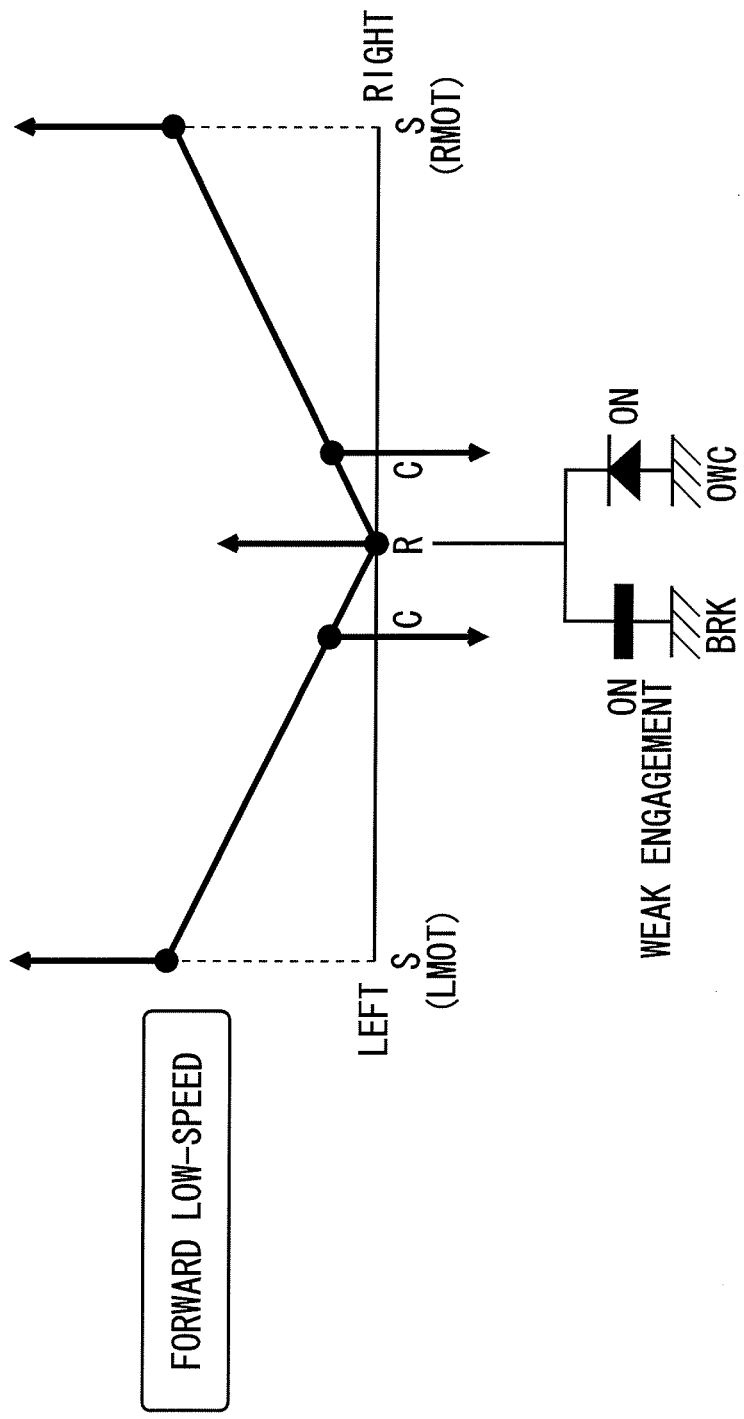
FIG. 6 is a speed alignment chart for the rear wheel drive unit at the time of forward low-speed travel of the vehicle.

Then, after the key position of the vehicle is set to ON, the rear wheels are driven by the rear wheel drive unit 1 at the time of forward low-speed travel, such as EV start or EV cruise, in which motor efficiency is high. As shown in FIG. 6, when power drive is performed so that the first and second electric motors 2A and 2B rotate in the forward direction, forward direction torques are applied to the sun gears 21A and 21B. At this time, as detailed above, the one-way clutch 50 is engaged and the ring gears 24A and 24B are locked. Hence, the planetary carriers 23A and 23B rotate in the forward direction and the vehicle travels forward. Travel resistance from the axles 10A and 10B is applied to the planetary carriers 23A and 23B in the reverse direction. In this way, at the start time of the vehicle 3, the key position is set to ON and the torques of the electric motors 2A and 2B are raised, whereby the one-way clutch 50 is engaged mechanically and the ring gears 24A and 24B are locked.

At this time, the hydraulic brakes 60A and 60B are controlled to a weakly engaged state. The weakly engaged state is a state in which engagement is performed with weak engagement forces smaller than the engagement forces obtained in the engaged state of the hydraulic brakes 60A and 60B and power transmission is possible. When the forward torques of the first and second electric motors 2A and 2B are input to the rear wheels Wr, the one-way clutch 50 is engaged, and power transmission can be performed using only the one-way clutch 50. However, in the case that the hydraulic brakes 60A and 60B provided in parallel with the one-way clutch 50 are set to the weakly engaged state so that the first and second electric motors 2A and 2B are set to the state of being connected to the rear wheels Wr, even if the input levels of the forward torques from the first and second electric motors 2A and 2B become lower temporarily and the one-way clutch 50 is disengaged, it is possible to suppress the transmission of the drive power between the first and second electric motors 2A and 2B and the rear wheels Wr from becoming disabled. Furthermore, when the travel mode of the vehicle is switched to deceleration regeneration described later, it is not necessary to perform rotation speed control for setting the first and second electric motors 2A and 2B to the state of being connected to the rear wheels Wr. Since the engagement forces of the hydraulic brakes 60A and 60B at the time when the one-way clutch 50 is engaged are made weaker than the engagement forces of the hydraulic brakes 60A and 60B at the time when the one-way clutch 50 is disengaged, energy to be consumed for engaging the hydraulic brakes 60A and 60B is reduced.

Figure 7:
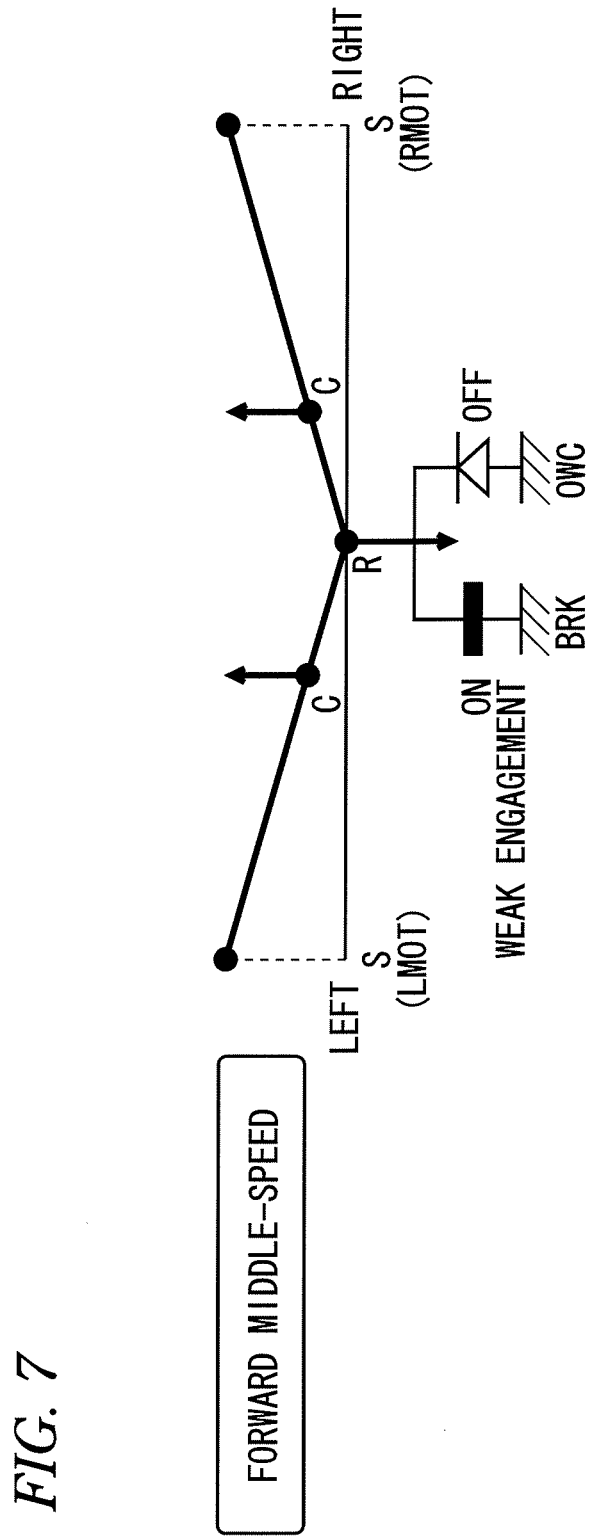
FIG. 7 is a speed alignment chart for the rear wheel drive unit at the time of forward middle-speed travel of the vehicle.

When the vehicle speed increases from the speed of the forward low-speed travel to the speed of the forward middle-speed travel in which engine efficiency is high, rear-wheel drive using the rear wheel drive unit 1 is shifted to front-wheel drive using the front wheel drive unit 6. As shown in FIG. 7, when the power drive of the first and second electric motors 2A and 2B is stopped, forward torques for performing forward travel are exerted from the axles 10A and 10B to the planetary carriers 23A and 23B, whereby the one-way clutch 50 is disengaged as described above. At this time, the hydraulic brakes 60A and 60B are also controlled so as to be set to the weakly engaged state.

Figure 8:
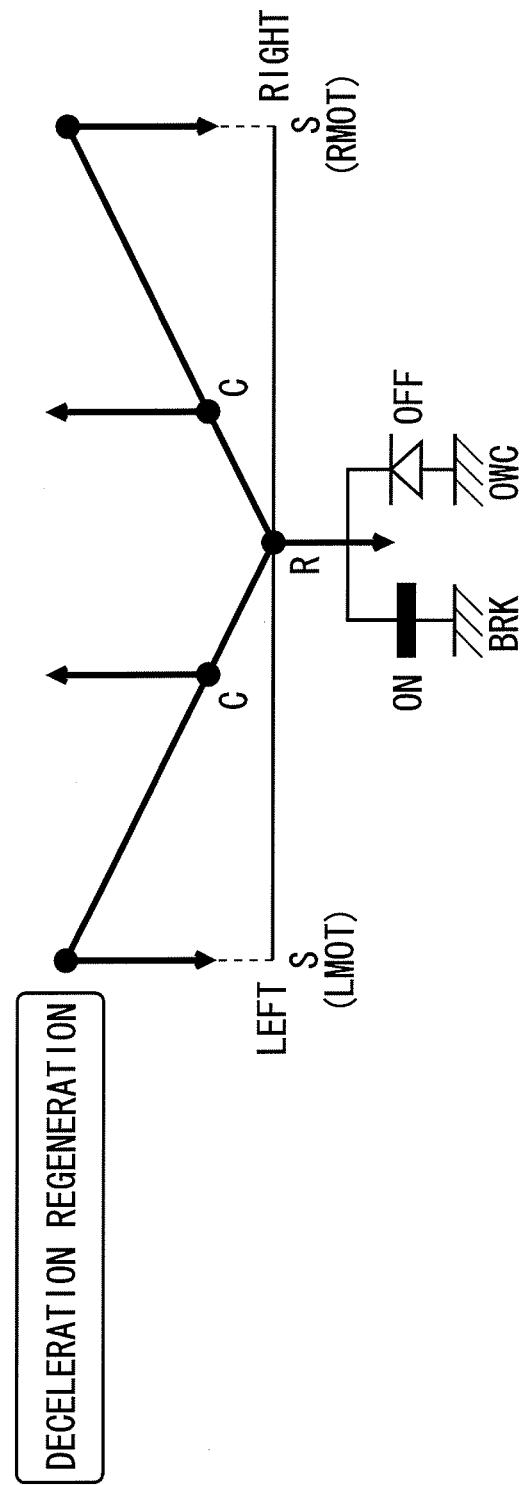
FIG. 8 is a speed alignment chart for the rear wheel drive unit at the time of deceleration regeneration.

When the first and second electric motors 2A and 2B being in the state shown in FIG. 6 or 7 are driven by regeneration, the forward torques for continuing forward travel are exerted from the axles 10A and 10B to the planetary carriers 23A and 23B as shown in FIG. 8, whereby the one-way clutch 50 is disengaged as described above. At this time, the hydraulic brakes 60A and 60B are controlled so as to be set to the engaged state (ON). Hence, the ring gears 24A and 24B are locked, regenerative braking torques in the reverse direction are exerted to the first and second electric motors 2A and 2B, and deceleration regeneration is performed in the first and second electric motors 2A and 2B. When the forward torques on the side of the rear wheels Wr are input to the first and second electric motors 2A and 2B as described above, the one-way clutch 50 is disengaged, and power cannot be transmitted using only the one-way clutch 50. However, in the case that the hydraulic brakes 60A and 60B provided in parallel with the one-way clutch 50 are engaged and the first and second electric motors 2A and 2B are set to the state of being connected to the rear wheels Wr, the state in which power transmission is possible can be maintained. In this state, the first and second electric motors 2A and 2B are controlled so as to be set to a regenerative drive state, whereby the energy of the vehicle 3 can be regenerated.

Then, at the time of acceleration, four-wheel drive is carried out using the front wheel drive unit 6 and the rear wheel drive unit 1. The state of the rear wheel drive unit 1 is the same as that at the time of forward low-speed travel.

At the time of forward high-speed travel, front-wheel drive using the front wheel drive unit 6 is performed. At this time, control is performed to stop the first and second electric motors 2A and 2B and to release the hydraulic brakes 60A and 60B. Since the forward torques on the side of the rear wheels Wr are input to the first and second electric motors 2A and 2B, the one-way clutch 50 is disengaged, and the hydraulic brakes 60A and 60B are controlled so as to be set to the released state, whereby the ring gears 24A and 24B starts rotating.

Figure 9:
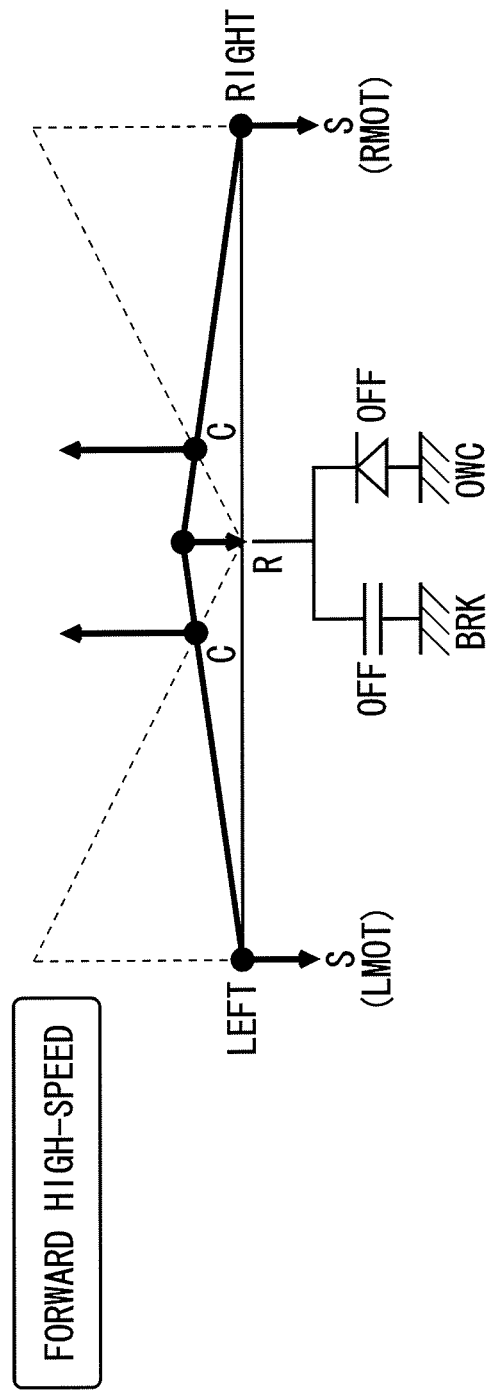
FIG. 9 is a speed alignment chart for the rear wheel drive unit at the time of forward high-speed travel time of the vehicle.

As shown in FIG. 9, when the power drive of the first and second electric motors 2A and 2B is stopped, forward torques for performing forward travel are exerted from the axles 10A and 10B to the planetary carriers 23A and 23B, whereby the one-way clutch 50 is disengaged as described above. At this time, the rotation losses of the sun gears 21A and 21B and the first and second electric motors 2A and 2B are input to the sun gears 21A and 21B as a resistance, and the rotation losses of the ring gears 24A and 24B are generated in the ring gears 24A and 24B.

The ring gears 24A and 24B are allowed to rotate freely (hereafter referred to as a ring-free state) by performing control to set the hydraulic brakes 60A and 60B to the released state, whereby the first and second electric motors 2A and 2B are disconnected from the rear wheels Wr and power transmission cannot be performed. Hence, accompanied rotations of the first and second electric motors 2A and 2B are prevented. In addition, over speed of the first and second electric motors 2A and 2B is prevented at the time of high-speed travel using the front wheel drive unit 6. In the above description, the first and second electric motors 2A and 2B are stopped in the ring-free state. However, the first and second electric motors 2A and 2B may be driven in the ring-free state (hereafter referred to as ring-free control). The ring-free control will be described later.

Figure 10:
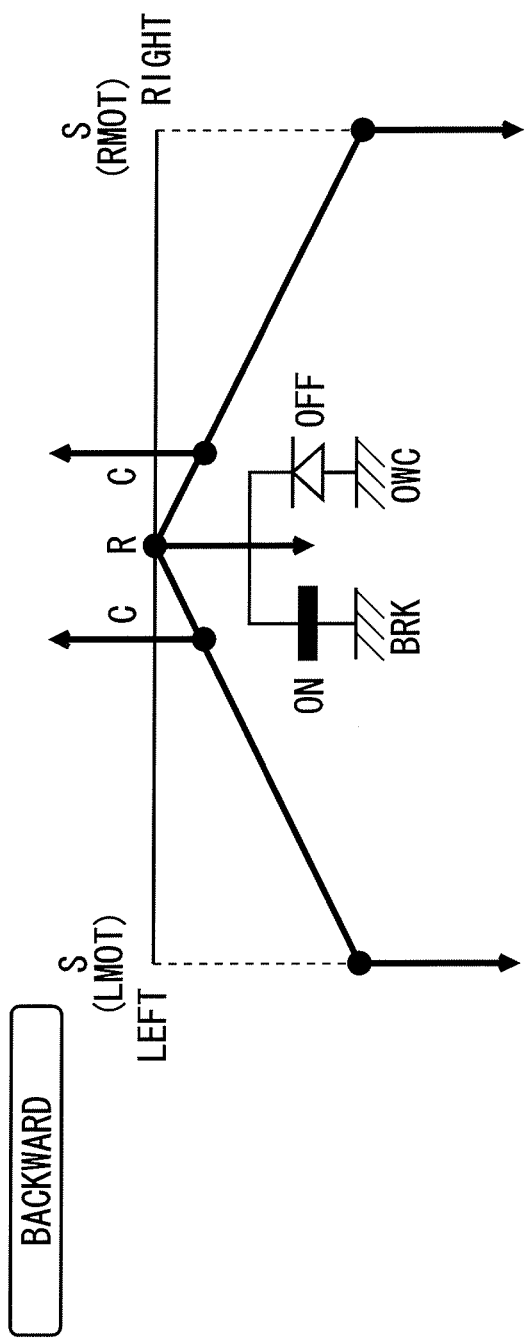
FIG. 10 is a speed alignment chart for the rear wheel drive unit at the time of backward travel of the vehicle.

At the time of backward travel, as shown in FIG. 10, when the first and second electric motors 2A and 2B are subjected to reverse power drive, reverse torques are applied to the sun gears 21A and 21B. At this time, the one-way clutch 50 is disengaged as described above.

At this time, control is performed to set the hydraulic brakes 60A and 60B to the engaged state (ON). Hence, the ring gears 24A and 24B are locked, and the planetary carriers 23A and 23B are rotated in the reverse direction, and backward travel is performed. The travel resistance from the axles 10A and 10B is exerted to the planetary carriers 23A and 23B in the forward direction. When the reverse torques from the first and second electric motors 2A and 2B are input to the rear wheels Wr as described above, the one-way clutch 50 is disengaged, and the drive power cannot be transmitted using only the one-way clutch 50. However, in the case that the hydraulic brakes 60A and 60B provided in parallel with the one-way clutch 50 are engaged and the first and second electric motors 2A and 2B are set to the state of being connected to the rear wheels Wr, the state in which power transmission is possible can be maintained, and the vehicle 3 can be moved backward using the torques of the first and second electric motors 2A and 2B.

As described above in the rear wheel drive unit 1, control is performed so that the hydraulic brakes 60A and 60B are engaged or released depending on the travel state of the vehicle, in other words, depending on whether the rotation direction of the first and second electric motors 2A and 2B is forward or backward and depending on whether the drive power is input from the first and second electric motors 2A and 2B or from the rear wheels Wr. Furthermore, the engagement forces of the hydraulic brakes 60A and 60B are adjusted even when the hydraulic brakes 60A and 60B are engaged.

Figure 11:
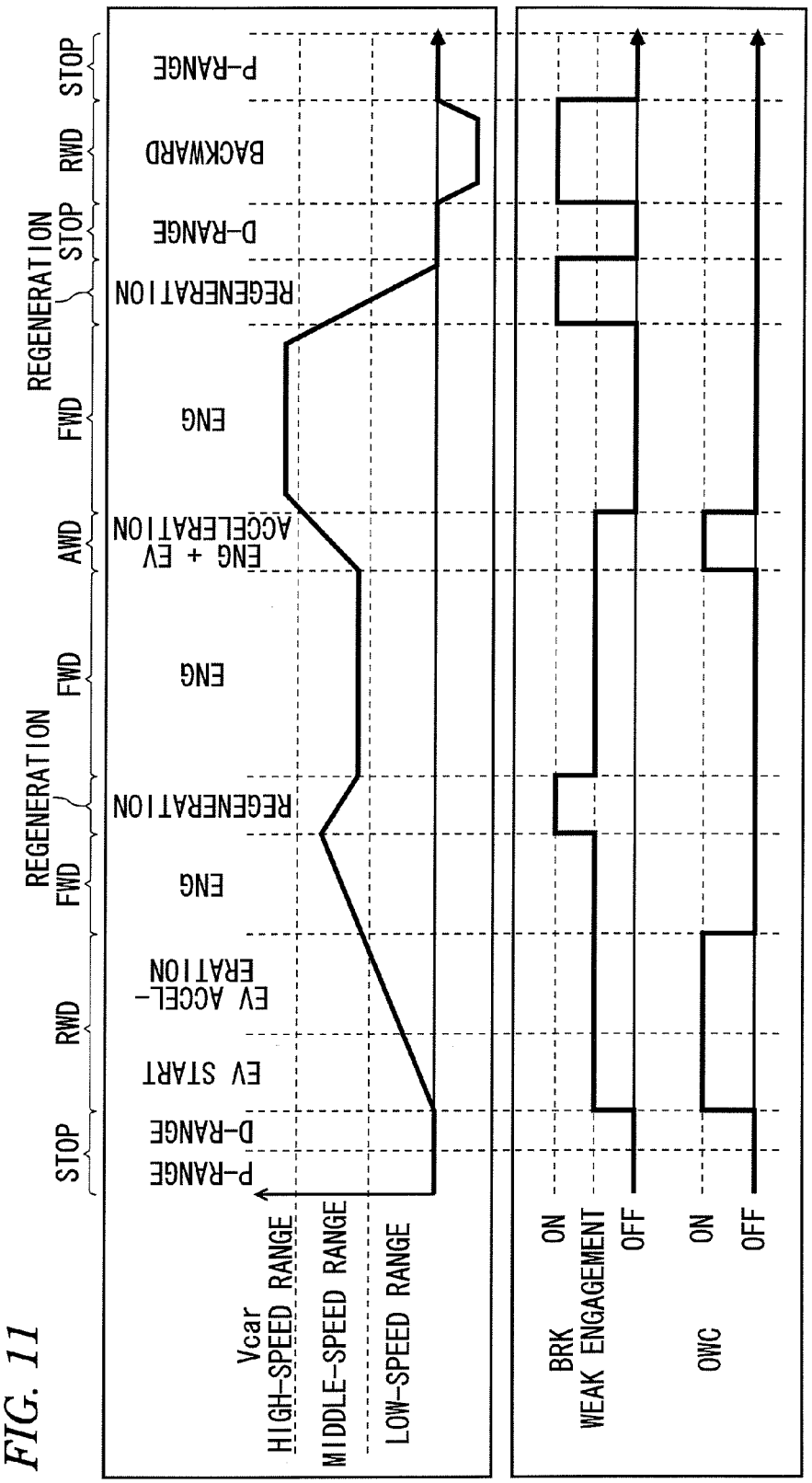
FIG. 11 is a timing chart during the travel of the vehicle.

FIG. 11 is a timing chart for the electric oil pump 70 (EOP), the one-way clutch 50 (OWC) and the hydraulic brakes 60A and 60B (BRK) when the state of the vehicle changes from the vehicle stop state to EV start, EV acceleration, ENG acceleration, deceleration regeneration, middle-speed ENG cruise, ENG+EV acceleration, high-speed ENG cruise, deceleration regeneration, vehicle stop, backward travel and vehicle stop.

First, the key position is set to ON and the shift is changed from the P-range to the D-range. Until the accelerator pedal is pressed, the one-way clutch 50 is held in the disengaged state (OFF), and the hydraulic brakes 60A and 60B are held in the released state (OFF). Then, when the accelerator pedal is pressed, EV start and EV acceleration are performed using the rear wheel drive unit 1 in the rear wheel drive mode (RWD). At this time, the one-way clutch 50 is engaged (ON), and the hydraulic brakes 60A and 60B are set to the weakly engaged state. Then, when the vehicle speed is changed from the low-speed range to the middle-speed range and the rear wheel drive mode is changed to the front wheel drive mode, ENG travel (FWD) using the internal combustion engine 4 is performed. At this time, the one-way clutch 50 is disengaged (OFF), and the state of the hydraulic brakes 60A and 60B is maintained unchanged (the weakly engaged state). Then, when deceleration regeneration is performed by pressing the brake pedal, for example, the hydraulic brakes 60A and 60B are engaged (ON) while the one-way clutch 50 remains unengaged (OFF). The state during middle-speed cruise using the internal combustion engine 4 is similar to that during the above-mentioned ENG travel. Next, when the accelerator pedal is pressed further and the front wheel drive mode is changed to the four-wheel drive mode (AWD), the one-way clutch 50 is engaged (ON) again. Then, when the vehicle speed is changed from the middle-speed range to the high-speed range, the ENG travel mode (FWD) using the internal combustion engine 4 is performed again. At this time, the one-way clutch 50 is disengaged (OFF) and the hydraulic brakes 60A and 60B are released (OFF). In the case that the first and second electric motors 2A and 2B are not requested to be driven, the first and second electric motors 2A and 2B are stopped. In the case that the electric motors are requested to be driven, ring-free control described later is performed. Then, the state at the time of deceleration regeneration becomes similar to that at the time of the above-mentioned deceleration regeneration. Then, when the vehicle stops, the one-way clutch 50 is disengaged (OFF) and the hydraulic brakes 60A and 60B are released (OFF).

Next, at the time of backward travel, the hydraulic brakes 60A and 60B are engaged (ON) while the one-way clutch 50 remains disengaged (OFF). Then, when the vehicle stops, the one-way clutch 50 is disengaged (OFF) and the hydraulic brakes 60A and 60B are released (OFF).

Next, ring-free control will be described.

The ring-free control is drive control for the first and second electric motors 2A and 2B in the state that the one-way clutch 50 is disengaged and the hydraulic brakes 60A and 60B are released, in other words, in a state in which the connected ring gears 24A and 24B are allowed to rotate freely (the ring-free state). With this control, target torques can be generated in the first and second electric motors 2A and 2B (target torque control) to generate a target yaw moment (target left-right difference torque), the first and/or second electric motors 2A and 2B can be controlled so as to rotate at target rotation speeds (target rotation speed control), and the rotation speed of the ring gears 24A and 24B (ring gear rotation speed obtaining control) can be obtained. Although rotation speed (r/min) is used as a rotation state amount in the following descriptions, other rotation state amounts, such as angular velocity (rad/s), may also be used without being limited to the rotation speed (r/min) Similarly, although motor torque (N·m) is used as a torque state amount, other torque state amounts, such as motor current (A) relating to motor torque, may also be used.

<Target Torque Control>

In the ring-free state, the first and second electric motors 2A and 2B are disconnected from the rear wheels Wr and power transmission is disabled as described above. However, in the case that control is performed so that a torque in the forward direction or the reverse direction is generated in the first electric motor 2A and so that a torque being equal in absolute value to the torque of the first electric motor 2A but opposite in direction (in the reverse direction or the forward direction) is generated in the second electric motor 2B, a left-right difference torque is generated between the left rear wheel LWr and the right rear wheel RWr without changing the rotation speeds of the first and second electric motors 2A and 2B, whereby a predetermined yaw moment can be generated.

Figure 12A:
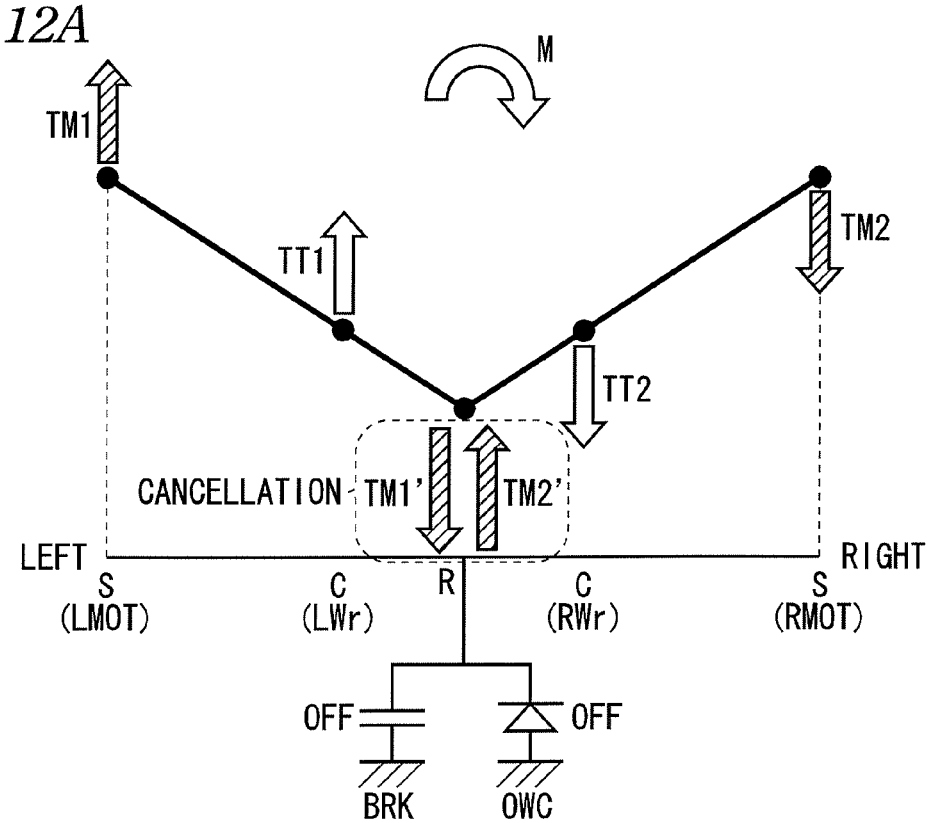
FIG. 12A is a speed alignment chart for the rear wheel drive unit in the case that the motors are controlled to output target torques in a ring-free state.

For example, a case in which a clockwise yaw moment M is generated in the vehicle 3 is taken as an example and specifically described referring to FIG. 12A. Torque control is performed so that a first motor base torque TM1 in the forward direction is generated in the first electric motor 2A, whereby the first motor base torque TM1 in the forward direction is exerted to the sun gear 21A. At this time, as in the case of FIG. 9, a forward torque (not shown) for making the vehicle travel forward is exerted from the axle 10A to the planetary carrier 23A. Hence, in the first planetary gear reducer 12A, the planetary carrier 23A serves as a fulcrum, and the first motor base torque TM1 in the forward direction is exerted to the sun gear 21A serving as a power point, whereby a first motor base torque distribution force TM1' in the reverse direction is exerted to the ring gears 24A and 24B serving as application points. Vectors due to losses etc. steadily applied to the respective rotation elements described above are not shown in FIG. 12 and the following figures.

On the other hand, torque control is performed so that a second motor base torque TM2 in the reverse direction is generated in the second electric motor 2B, whereby the second motor base torque TM2 in the reverse direction is exerted to the sun gear 21B. At this time, as in the case of FIG. 9, a forward torque (not shown) for making the vehicle travel forward is exerted from the axle 10B to the planetary carrier 23B. Hence, in the second planetary gear reducer 12B, the planetary carrier 23B serves as a fulcrum, and the second motor base torque TM2 in the reverse direction is exerted to the sun gear 21B serving as a power point, whereby a second motor base torque distribution force TM2' in the forward direction is exerted to the ring gears 24A and 24B serving as application points.

Since the first motor base torque TM1 and the second motor base torque TM2 are equal in absolute value but opposite in direction, the first motor base torque distribution force TM1' in the reverse direction exerted to the ring gears 24A and 24B and the second motor base torque distribution force TM2' in the forward direction also exerted to the ring gears 24A and 24B are cancelled with each other. Hence, the first motor base torque TM1 and the second motor base torque TM2 do not contribute to the change in rotation and the respective rotation states of the sun gears 21A and 21B and the ring gears 24A and 24B are maintained unchanged. At this time, a left rear wheel torque TT1 in the forward direction obtained by multiplying the reduction ratio of the first planetary gear reducer 12A to the first motor base torque TM1 is exerted to the planetary carrier 23A, and a right rear wheel torque TT2 in the reverse direction obtained by multiplying the reduction ratio of the second planetary gear reducer 12B to the second motor base torque TM2 is exerted to the planetary carrier 23B.

Since the reduction ratios of the first and second planetary gear reducers 12A and 12B are equal, the left and right rear wheel torques TT1 and TT2 are equal in absolute value but opposite in direction. As a result, the clockwise yaw moment M depending on the difference (TT1−TT2) between the left and right rear wheel torques TT1 and TT2 is generated stably.

The target motor base torques at the time when the first and second electric motors 2A and 2B are subjected to the target torque control are obtained based on the target yaw moment of the vehicle 3. A method for obtaining the target motor base torques will be described below using the following expressions.

When it is assumed that the left rear wheel target torque of the left rear wheel LWr is WTT1, that the right rear wheel target torque of the right rear wheel RWr is WTT2, that the total target torque of the left and right rear wheels LWr and RWr (the sum of the left rear wheel torque and the right rear wheel torque) is TRT, and that the difference between the target torques of the left and right rear wheels LWr and RWr (the difference between the left rear wheel torque and the right rear wheel torque) is ΔTT, the following expressions (1) and (2) are established.

$$WTT1+WTT2=TRT \quad (1)$$

$$WTT1-WTT2=\Delta TT \quad (2)$$

When it is assumed that the target yaw moment (clockwise direction is positive) is YMT, that the radius of the wheel is r, and that the tread width (the distance between the left and right rear wheels LWr and RWr) is Tr, ΔTT is represented by the following expression (3).

$$\Delta TT = 2 \cdot r \cdot YMT/Tr \quad (3)$$

Since the torques of the first and second electric motors 2A and 2B in the same direction are not transmitted to the rear wheels Wr in the ring-free state, the total target torque TRT of the left and right rear wheels LWr and RWr is zero. Hence, the target torques WTT1 and WTT2 of the left and right rear wheels LWr and RWr are determined uniquely by the above-mentioned expressions (1) and (2).

That is to say, $$WTT1=-WTT2=\Delta TT/2 \quad (4)$$

Furthermore, when it is assumed that the target motor base torque of the first electric motor 2A connected to the left rear wheel LWr is TTM1 and that the target motor base torque of the second electric motor 2B connected to the right rear wheel RWr is TTM2, the target motor base torques TTM1 and TTM2 of the first and second electric motors 2A and 2B on the left and right sides are derived from the following expressions (5) and (6).

$$TTM1=(1/\text{Ratio}) \cdot WTT1 \quad (5)$$

$$TTM2=(1/\text{Ratio}) \cdot WTT2 \quad (6)$$

Ratio designates the reduction ratio of the first and second planetary gear reducers 12A and 12B.

From the above-mentioned expressions (4) to (6), the target motor base torques TTM1 and TTM2 of the first and second electric motors 2A and 2B on the left and right sides are represented by the following expressions (7) and (8).

$$TTM1 = (1/\text{Ratio}) \cdot \Delta TT/2 \qquad (7)$$

$$TTM2 = -(1/\text{Ratio}) \cdot \Delta TT/2 \qquad (8)$$

Hence, the target torque difference ΔTT between the left and right rear wheels LWr and RWr is obtained based on the target yaw moment YMT of the vehicle 3, and the value obtained by dividing the half torque of the target torque difference ΔTT by the reduction ratio of the first planetary gear reducer 12A is set to the target motor base torques TTM1 and TTM2 of the first and second electric motors 2A and 2B being subjected to the target torque control, whereby the desired yaw moment can be generated.

<Target Rotation Speed Control>

In the ring-free state, that is, in the state in which the one-way clutch 50 is disengaged and the hydraulic brakes 60A and 60B are released, even if the torques in the same direction are generated from the first and second electric motors 2A and 2B, the connected ring gears 24A and 24B are not locked, and the motor torque distribution forces described above are not cancelled. Hence, no torque is transmitted to the rear wheels Wr, but only the rotation speeds of the sun gears 21A and 21B (the first and second electric motors 2A and 2B) and the ring gears 24A and 24B are changed.

In this case, the rotation control torques being equal in absolute value and having the same direction are generated in the first and second electric motors 2A and 2B. Hence, the first and/or second electric motors 2A and/or 2B can be controlled at the desired rotation speeds without transmitting the rotation control torques to the rear wheels Wr.

Figure 12B:
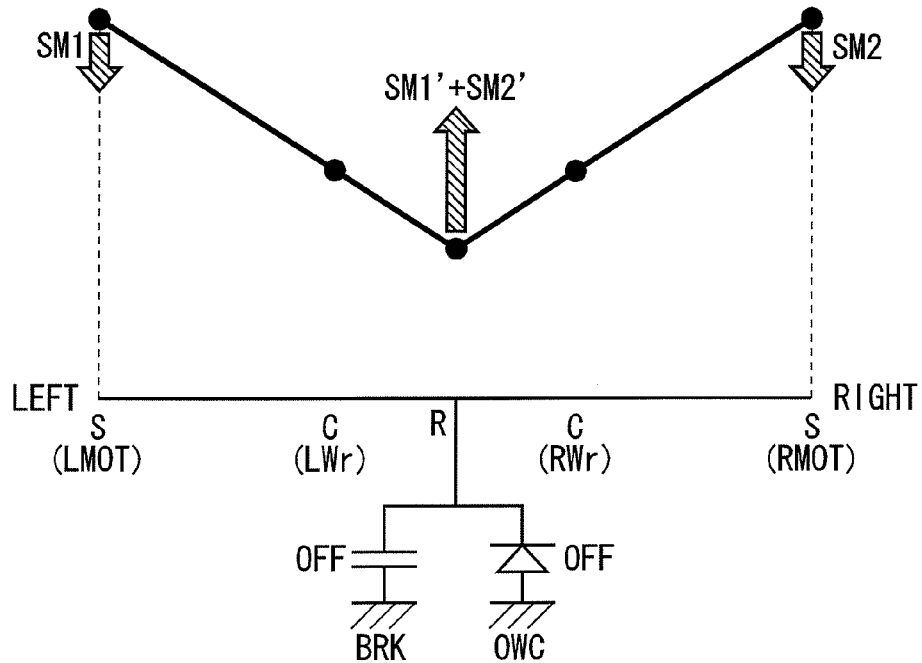
FIG. 12B is a speed alignment chart for the rear wheel drive unit in the case that the motors are controlled to rotate at target rotation speeds in the ring-free state.

For example, a case in which the rotation speeds of the first and second electric motors 2A and 2B are lowered is taken as an example and specifically described referring to FIG. 12B. Torque control is performed so that a first rotation control torque SM1 in the reverse direction is generated in the first electric motor 2A, whereby the first rotation control torque SM1 in the reverse direction is exerted to the sun gear 21A. At this time, as in the case of FIG. 9, a forward torque (not shown) for making the vehicle travel forward is exerted from the axle 10A to the planetary carrier 23A. Hence, in the first planetary gear reducer 12A, the planetary carrier 23A serves as a fulcrum, and the first rotation control torque SM1 in the reverse direction is exerted to the sun gear 21A serving as a power point, whereby a first rotation control torque distribution force SM1' in the forward direction is exerted to the ring gears 24A and 24B serving as application points.

Similarly, torque control is performed so that a second rotation control torque SM2 in the reverse direction is generated in the second electric motor 2B, whereby the second rotation control torque SM2 in the reverse direction is exerted to the sun gear 21B. At this time, as in the case of FIG. 9, a forward torque (not shown) for making the vehicle travel forward is exerted from the axle 10B to the planetary carrier 23B. Hence, in the second planetary gear reducer 12B, the planetary carrier 23B serves as a fulcrum, and the second rotation control torque SM2 in the reverse direction is exerted to the sun gear 21B serving as a power point, whereby a second rotation control torque distribution force SM2' in the forward direction is exerted to the ring gears 24A and 24B serving as application points.

Since the first and second rotation control torques SM1 and SM2 are torques being equal in absolute value and having the same direction, the first and second rotation control torque distribution forces SM1' and SM2' exerted to the ring gears 24A and 24B are also torques being equal in absolute value and having the same direction. The first and second rotation control torque distribution forces SM1' and SM2' are exerted in the direction of increasing the rotation speeds of the ring gears 24A and 24B. At this time, since torques balanced with the first and second rotation control torques SM1 and SM2 do not exist in the first and second planetary gear reducers 12A and 12B, the left and right rear wheel torques due to the first and second rotation control torques SM1 and SM2 are not generated in the planetary carriers 23A and 23B. Hence, the first and second rotation control torques SM1 and SM2 contribute only to the change in rotation and decrease the rotation speeds of the first and second electric motors 2A and 2B and the rotation speeds of the sun gears 21A and 21B. In addition, the first and second rotation control torque distribution forces SM1' and SM2' increase the rotation speed of the ring gears 24A and 24B. In the case that the first and second rotation control torques SM1 and SM2 generated appropriately as described above, the first and second electric motors 2A and 2B can be controlled to rotate at given target rotation speeds, and the rotation speeds of the first and second electric motors 2A and 2B eventually become equal to the motor target rotation speeds.

Since the ring gears 24A and 24B are connected to each other in the rear wheel drive unit 1, control cannot be performed in some cases so that the motor target rotation speed of the first electric motor 2A and the motor target rotation speed of the second electric motor 2B are satisfied simultaneously. In such a case, one of the electric motors is subjected to the target rotation speed control so that the target rotation speed control of either one of the electric motors is satisfied.

Although not described in details, in the ring-free state, by performing the target torque control in which the target torques are generated in the first and second electric motors 2A and 2B so that the target yaw moment is generated, and the target rotation speed control in which the first and second electric motors 2A and 2B are controlled so as to rotate at the target rotation speeds in the ring-free state at the same time, the first and second electric motors 2A and 2B can be controlled so as to rotate at the desired rotation speeds while the desired yaw moment is generated.

Next, wheel speed obtaining control and motor rotation speed obtaining control, features of the present invention, will be described below. Although rotation speed (r/min) is used as a rotation state amount in the following descriptions, other rotation state amounts, such as angular velocity (rad/s), may also be used without being limited to the rotation speed (r/min).

<Wheel Speed Obtaining Control>

Wheel speed obtaining control is performed to obtain wheel rotation speed (hereafter also referred to as wheel speed) serving as the rotation speed of the right rear wheel RWr using the following method (A) or (B) in the above-mentioned ring-free state.

(A) The rotation speed of the ring gears 24A and 24B is obtained as a ring gear rotation speed conversion value Rb based on the motor rotation speed detection value LMa (first rotation state amount detection value) detected using the resolver 20A and the wheel rotation speed detection value LWa (second rotation state amount detection value) detected using the wheel speed sensor 13A, and a wheel rotation speed conversion value RWb serving as the rotation speed of the right rear wheel RWr at the installation position of the wheel speed sensor 13B and obtained based on the ring gear rotation speed conversion value Rb and the motor rotation speed detection value RMa (third rotation state amount detection value) detected using the resolver 20B or the wheel rotation speed detection value RWa (fourth rotation state amount detection value) of the right rear wheel RWr detected using the wheel speed sensor 13B, whichever larger, is used as the rotation speed of the right rear wheel RWr.

(B) The rotation speed of the ring gears 24A and 24B is obtained as the ring gear rotation speed conversion value Rb based on the motor rotation speed detection value LMa detected using the resolver 20A and the wheel rotation speed detection value LWa detected using the wheel speed sensor 13A, and in the case that a motor rotation speed conversion value RMb serving as the rotation speed of the second electric motor 2B at the installation position of the resolver 20B and obtained based on the ring gear rotation speed conversion value Rb and the wheel rotation speed detection value RWa detected using the wheel speed sensor 13B is larger than the motor rotation speed detection value RMa detected using the resolver 20B (RMb>RMa), the wheel rotation speed detection value RWa is used as the rotation speed of the right rear wheel RWr; in the case that the motor rotation speed conversion value RMb is smaller than the motor rotation speed detection value RMa (RMb<RMa), the wheel rotation speed conversion value RWb serving as the rotation speed of the right rear wheel RWr at the installation position of the wheel speed sensor 13B and obtained based on the ring gear rotation speed conversion value Rb and the motor rotation speed detection value RMa is used as the rotation speed of the right rear wheel RWr.

Figure 13:
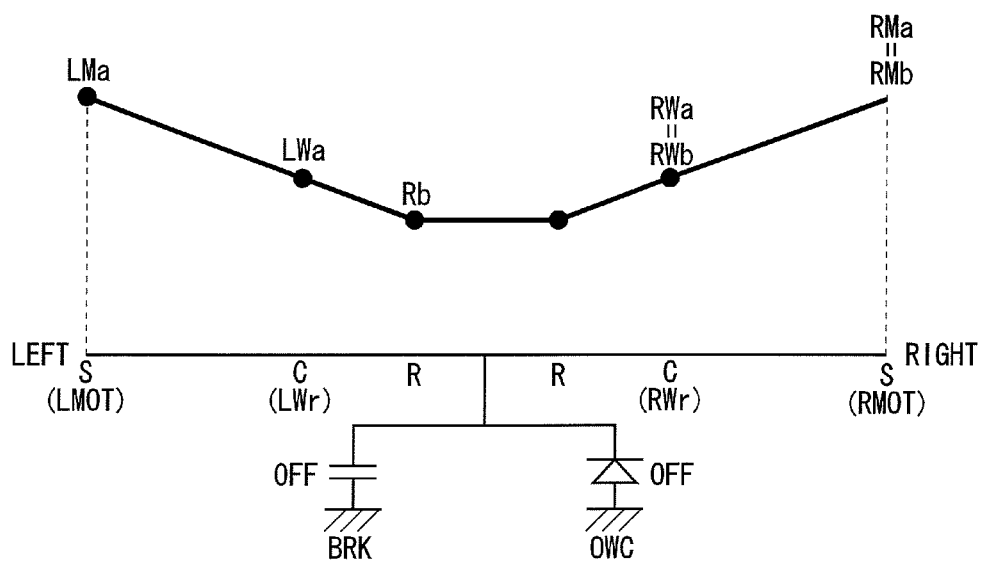
FIG. 13 is a speed alignment chart for the rear wheel drive unit in the ring-free state.

As shown in FIG. 13, in the case that the resolvers 20A and 20B and the wheel speed sensors 13A and 13B are functioning normally, in the ring-free state, the wheel rotation speed conversion value RWb serving as the rotation speed of the right rear wheel RWr at the installation position of the wheel speed sensor 13B and obtained based on the ring gear rotation speed conversion value Rb serving as the rotation speed of the ring gears 24A and 24B and obtained based on the motor rotation speed detection value LMa detected using the resolver 20A and the wheel rotation speed detection value LWa detected using the wheel speed sensor 13A and the motor rotation speed detection value RMa detected using the resolver 20B becomes equal to the wheel rotation speed detection value RWa of the right rear wheel RWr detected using the wheel speed sensor 13B (RWb=RWa). The ring gear rotation speed conversion value Rb is herein the rotation speed of the ring gear 24A calculated based on the motor rotation speed detection value LMa, the wheel rotation speed detection value LWa and the reduction ratio of the first planetary gear reducer 12A and is also the rotation speed of the ring gear 24B because the ring gears 24A and 24B are connected to each other in this embodiment. Furthermore, the wheel rotation speed conversion value RWb is calculated based on the ring gear rotation speed conversion value Rb, the motor rotation speed detection value RMa and the reduction ratio of the second planetary gear reducer 12B. Since the ring gears 24A and 24B of the first and second planetary gear reducers 12A and 12B are connected to each other and have the same rotation state at all times, the ring gears 24A and 24B are designated by a single R in FIGS. 5 to 10 and 12. However, in FIG. 13, the ring gears 24A and 24B are respectively designated by two separate Rs for the sake of explanation. This also applies to FIGS. 14 to 17 described later.

Similarly, as shown in FIG. 13, the motor rotation speed conversion value RMb serving as the rotation speed of the second electric motor 2B at the installation position of the resolver 20B and obtained based on the ring gear rotation speed conversion value Rb obtained based on the motor rotation speed detection value LMa detected using the resolver 20A and the wheel rotation speed detection value LWa detected using the wheel speed sensor 13A and the wheel rotation speed detection value RWa detected using the wheel speed sensor 13B becomes equal to the motor rotation speed detection value RMa detected using the resolver 20B (RMb=RMa). The motor rotation speed conversion value RMb is calculated based on the ring gear rotation speed conversion value Rb, the wheel rotation speed detection value RWa and the reduction ratio of the second planetary gear reducer 12B.

On the other hand, in the case that one of the sensors, such as one of the resolvers 20A and 20B and the wheel speed sensors 13A and 13B, is faulty because of wire breakage or the like, a signal indicating a rotation speed lower (including zero rotation speed) than the normal rotation speed is fed from the faulty sensor. As a result, the wheel rotation speed conversion value RWb does not become equal to the wheel rotation speed detection value RWa (RWb≠RWa), and the motor rotation speed conversion value RMb does not become equal to the motor rotation speed detection value RMa (RMb≠RMa).

Figure 14:
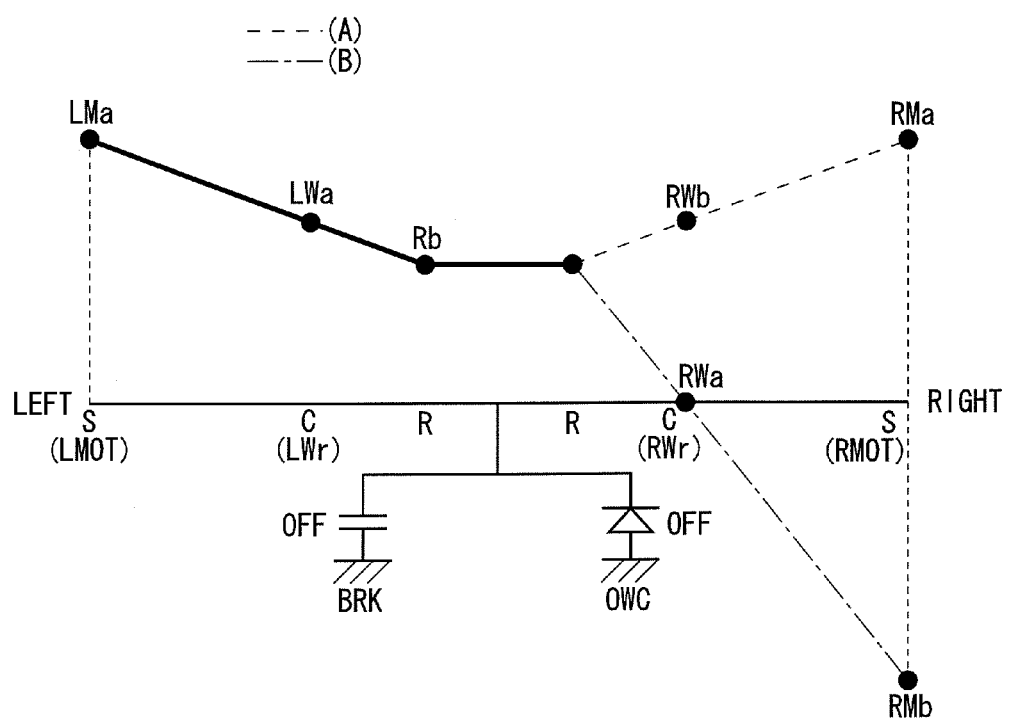
FIG. 14 is a speed alignment chart for the rear wheel drive unit in the case that a wheel speed sensor 13B is faulty because of wire breakage.

For example, in the case that the wheel speed sensor 13B is faulty because of wire breakage, as shown in FIG. 14, the wheel rotation speed detection value RWa becomes zero (RWa=0) due to grounding. At this time, as indicated by (A), the wheel rotation speed conversion value RWb calculated based on the ring gear rotation speed conversion value Rb and the motor rotation speed detection value RMa becomes larger than the wheel rotation speed detection value RWa detected using the wheel speed sensor 13B that is faulty due to wire breakage (RWb>RWa) and thus becomes a normal value. Hence, at this time, the wheel rotation speed conversion value RWb becomes equal to the rotation speed of the right rear wheel RWr.

On the other hand, as indicated by (B), the motor rotation speed conversion value RMb obtained based on the ring gear rotation speed conversion value Rb and the wheel rotation speed detection value RWa becomes a negative value smaller than the motor rotation speed detection value RMa detected using the normal resolver 20B (RMb<0<RMa) and thus becomes an abnormal value.

Figure 15:
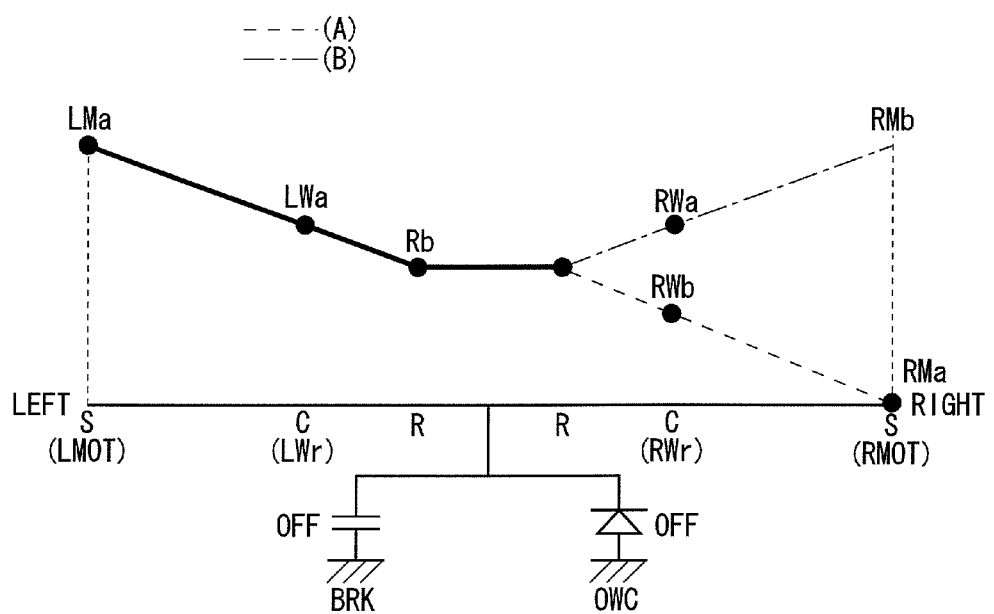
FIG. 15 is a speed alignment chart for the rear wheel drive unit in the case that a resolver 20B is faulty because of wire breakage.

Furthermore, in the case that the resolver 20B is faulty because of wire breakage, as shown in FIG. 15, the motor rotation speed detection value RMa becomes zero (RMa=0) due to grounding. At this time, as indicated by (A), the wheel rotation speed conversion value RWb calculated based on the ring gear rotation speed conversion value Rb and the motor rotation speed detection value RMa becomes smaller than the wheel rotation speed detection value RWa detected using the normal wheel speed sensor 13B (RWb<RWa) and thus becomes an abnormal value. Hence, at this time, the wheel rotation speed detection value RWa becomes equal to the rotation speed of the right rear wheel RWr.

On the other hand, as indicated by (B), the motor rotation speed conversion value RMb obtained based on the ring gear rotation speed conversion value Rb and the wheel rotation speed detection value RWa becomes a value larger than the motor rotation speed detection value RMa detected using the resolver 20B that is faulty due to wire breakage (RMb>RMa) and thus becomes a normal value.

Figure 16:
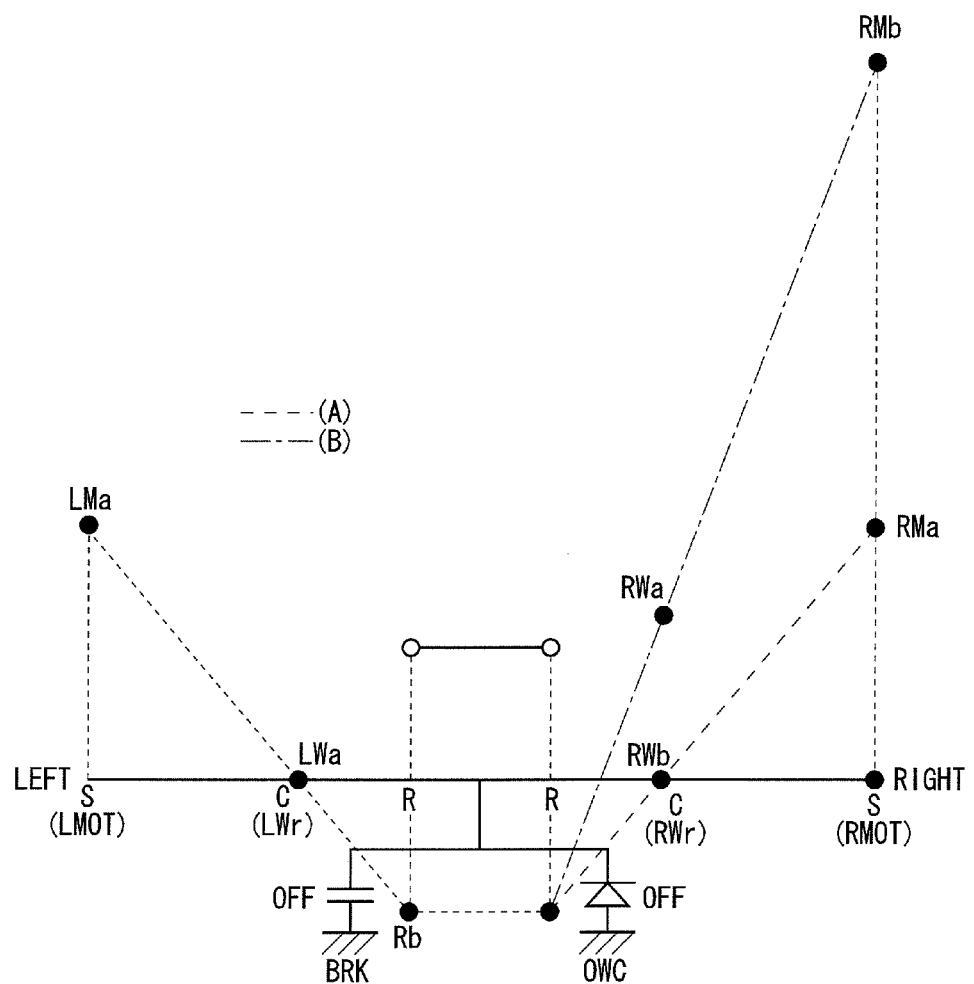
FIG. 16 is a speed alignment chart for the rear wheel drive unit in the case that a wheel speed sensor 13A is faulty because of wire breakage.

Moreover, in the case that the wheel speed sensor 13A is faulty because of wire breakage, as shown in FIG. 16, the wheel rotation speed detection value LWa becomes zero (LWa=0) due to grounding. At this time, the ring gear rotation speed conversion value Rb calculated based on the motor rotation speed detection value LMa and the wheel rotation speed detection value LWa becomes a negative value (Rb<0) and is thus calculated to a value lower than the actual rotation speed of the ring gears 24A and 24B (indicated by ○ in FIG. 16). In addition, as indicated by (A), the wheel rotation speed conversion value RWb calculated based on the ring gear rotation speed conversion value Rb and the motor rotation speed detection value RMa becomes zero and becomes smaller than the wheel rotation speed detection value RWa detected using the normal wheel speed sensor 13B (RWb=0<RWa) and thus becomes an abnormal value. Hence, at this time, the wheel rotation speed detection value RWa becomes equal to the rotation speed of the right rear wheel RWr.

Similarly, as indicated by (B), the motor rotation speed conversion value RMb obtained based on the ring gear rotation speed conversion value Rb and the wheel rotation speed detection value RWa becomes a value larger than the motor rotation speed detection value RMa detected using the normal resolver 20B (RMb>RMa) and thus becomes an abnormal value.

As described above, it is understood that even in the case that the wheel speed sensor 13A, the wheel speed sensor 13B or the resolver 20B is faulty, the wheel rotation speed conversion value RWb or the wheel rotation speed detection value RWa, whichever larger, should only be used as the rotation speed of the right rear wheel RWr by using the control method of the above-mentioned wheel speed obtaining control (A). It is also understood that in the case that the motor rotation speed conversion value RMb is larger than the motor rotation speed detection value RMa (RMb>RMa in the cases in FIGS. 15 and 16), the wheel rotation speed detection value RWa should only be used as the rotation speed of the right rear wheel RWr and that in the case that the motor rotation speed conversion value RMb is smaller than the motor rotation speed detection value RMa (RMb<RMa in the case in FIG. 14), the wheel rotation speed conversion value RWb should only be used as the rotation speed of the right rear wheel RWr by using the control method of the above-mentioned wheel speed obtaining control (B).

Figure 17:
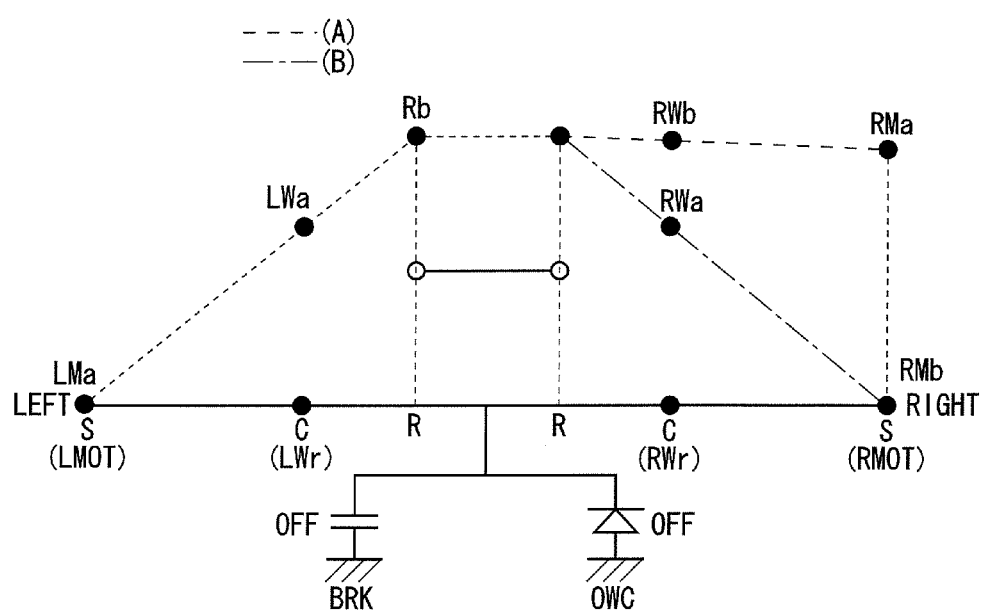
FIG. 17 is a speed alignment chart for the rear wheel drive unit in the case that a resolver 20A is faulty because of wire breakage.

Furthermore, in the case that the resolver 20A is faulty because of wire breakage, as shown in FIG. 17, the motor rotation speed detection value LMa becomes zero (LMa=0) due to grounding. Hence, the ring gear rotation speed conversion value Rb calculated based on the motor rotation speed detection value LMa and the wheel rotation speed detection value LWa is thus calculated to a value higher than the actual rotation speed of the ring gears 24A and 24B (indicated by "○" in FIG. 17). As a result, as indicated by (A), the wheel rotation speed conversion value RWb calculated based on the ring gear rotation speed conversion value Rb and the motor rotation speed detection value RMa becomes larger than the wheel rotation speed detection value RWa detected using the normal wheel speed sensor 13B (RWb>RWa) and thus becomes an abnormal value.

Furthermore, as indicated by (B), the motor rotation speed conversion value RMb obtained based on the ring gear rotation speed conversion value Rb and the wheel rotation speed detection value RWa becomes zero due to grounding and smaller than the motor rotation speed detection value RMa detected using the normal resolver 20B due to grounding (RMb=0<RMa) and thus becomes an abnormal value.

As described above, in the case that the resolver 20A is faulty, it is understood that it is improper to use the wheel rotation speed conversion value RWb, the larger value between the wheel rotation speed conversion value RWb and the wheel rotation speed detection value RWa, as the rotation speed of the right rear wheel RWr by using the control method of the above-mentioned wheel speed obtaining control (A). It is also understood that in the case that the motor rotation speed conversion value RMb is smaller than the motor rotation speed detection value RMa (RMb<RMa), it is improper to use the wheel rotation speed conversion value RWb as the rotation speed of the right rear wheel RWr by using the control method of the above-mentioned wheel speed obtaining control (B). For this reason, in the case that the resolver 20A is faulty, it is proper to use the wheel rotation speed detection value RWa as the rotation speed of the right rear wheel RWr.

Hence, in the control methods of the above-mentioned wheel speed obtaining control (A) and wheel speed obtaining control (B), a judgment is made beforehand as to whether the resolver 20A is faulty. In the case that the resolver 20A is faulty, the wheel rotation speed detection value RWa detected using the wheel speed sensor 13B is used as the rotation speed of the right rear wheel RWr. In the case that the resolver 20A is not faulty, the above-mentioned normal control is performed. The fault of the resolver 20A can be self-detected based on the abnormality in the motor rotation speed detection value LMa, for example.

Figure 18:
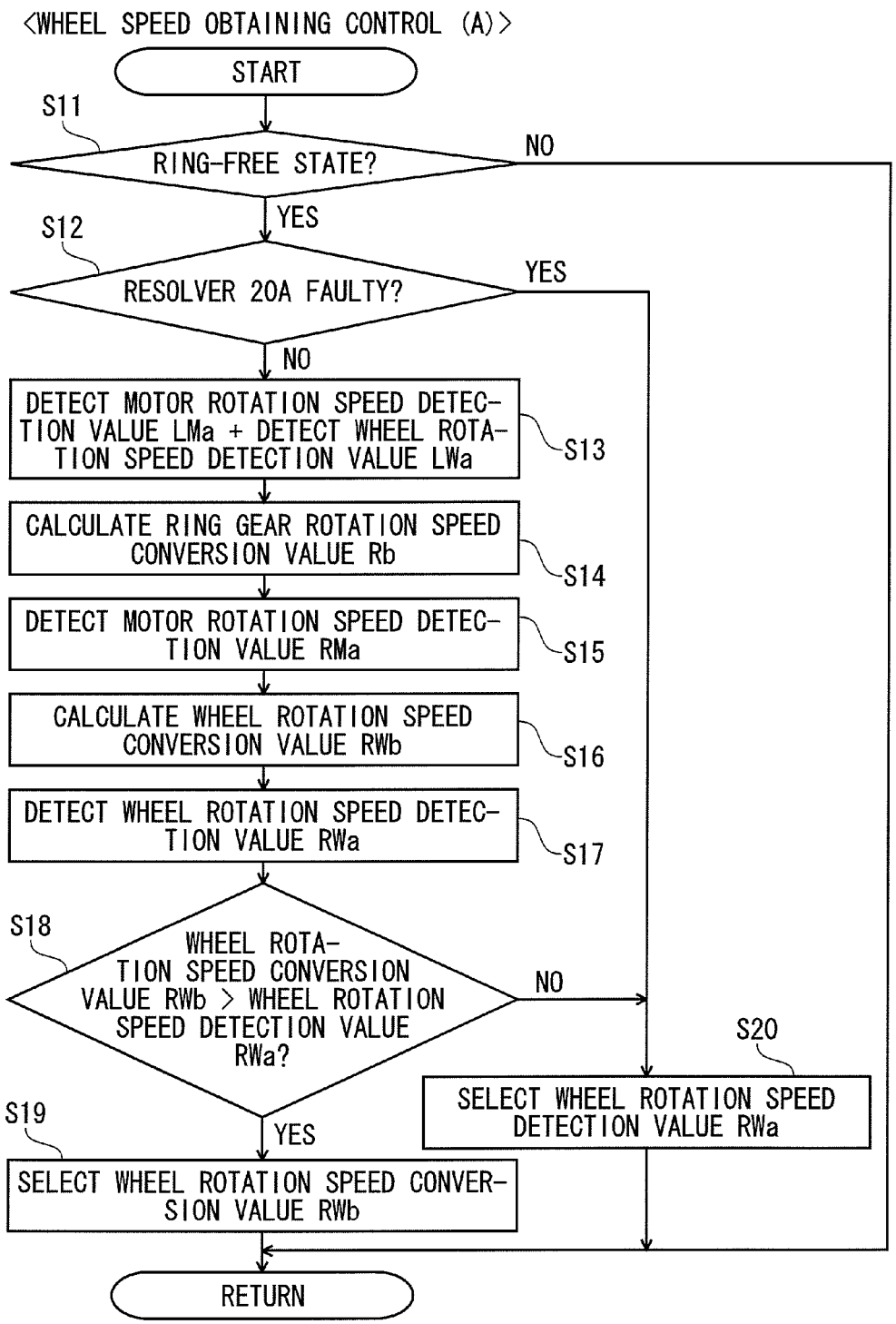
FIG. 18 is a chart showing the control flow of wheel speed obtaining control (A)

More specifically, in the control method of the above-mentioned wheel speed obtaining control (A), as shown in FIG. 18, first, a detection is made as to whether the state is the ring-free state (at S11). The detection as to whether the state is the ring-free state may be made by detecting whether the one-way clutch 50 is engaged and the hydraulic brakes 60A and 60B are engaged, or the detection may also be made using sensors provided for the ring gears 24A and 24B (the same applies to the following control (B)). As the result of the detection, in the case that the state is not the ring-free state, the wheel speed obtaining control is ended; in the case that the state is the ring-free state, a judgment is made as to whether the resolver 20A is faulty (at S12). In the case that the resolver 20A is faulty, the wheel rotation speed detection value RWa is selected as the rotation speed of the right rear wheel RWr (at S20) and the wheel speed obtaining control is ended.

On the other hand, in the case that the resolver 20A is not faulty, the motor rotation speed detection value LMa is detected using the resolver 20A, and the wheel rotation speed detection value LWa is detected using the wheel speed sensor 13A (at S13). Then, the rotation speed of the ring gears 24A and 24B is calculated as the ring gear rotation speed conversion value Rb based on the motor rotation speed detection value LMa and the wheel rotation speed detection value LWa (at S14).

Next, the motor rotation speed detection value RMa is detected using the resolver 20B (at S15), and the wheel rotation speed conversion value RWb is calculated based on the ring gear rotation speed conversion value Rb and the motor rotation speed detection value RMa (at S16). Furthermore, the wheel rotation speed detection value RWa is detected using the wheel speed sensor 13B (at S17), and the wheel rotation speed conversion value RWb is compared with the wheel rotation speed detection value RWa (at S18).

As the result of the comparison, if the wheel rotation speed conversion value RWb is larger than the wheel rotation speed detection value RWa (RWb>RWa), the wheel rotation speed conversion value RWb is selected and the wheel rotation speed conversion value RWb is used as the rotation speed of the right rear wheel RWr (at S19). On the other hand, in the case that the wheel rotation speed conversion value RWb is smaller than the wheel rotation speed detection value RWa (RWb<RWa), the wheel rotation speed detection value RWa is selected and the wheel rotation speed detection value RWa is used as the rotation speed of the right rear wheel RWr (at S20). In the case that the wheel rotation speed conversion value RWb is equal to the wheel rotation speed detection value RWa (RWb=RWa), the resolvers 20A and 20B and the wheel speed sensors 13A and 13B are all normal, and the wheel rotation speed conversion value RWb or the wheel rotation speed detection value RWa may be used as the rotation speed of the right rear wheel RWr. However, the wheel rotation speed detection value RWa is herein used as the rotation speed of the right rear wheel RWr.

Figure 19:
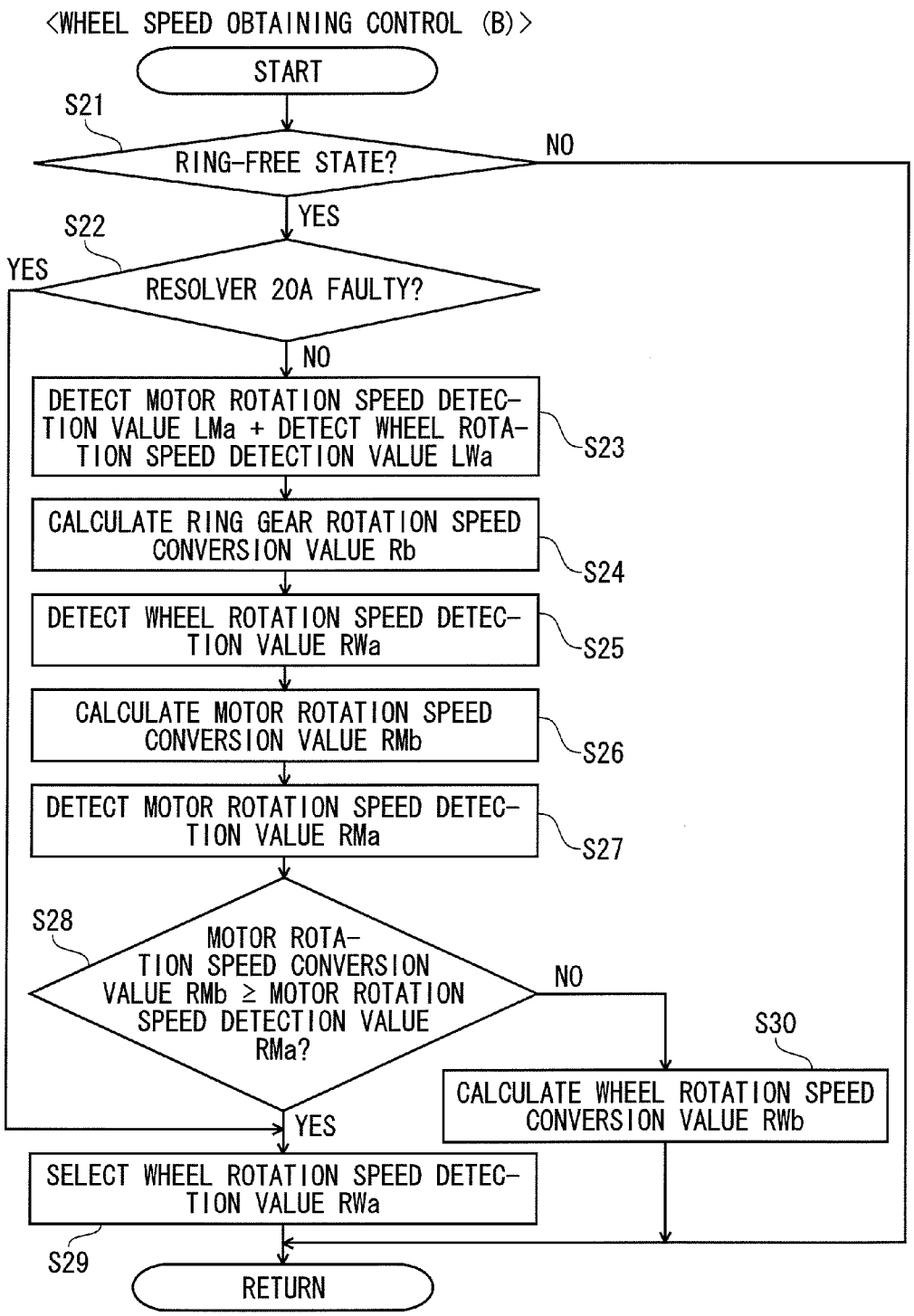
FIG. 19 is a chart showing the control flow of wheel speed obtaining control (B)

In the control method of the above-mentioned wheel speed obtaining control (B), as shown in FIG. 19, first, a detection is made as to whether the state is the ring-free state (at S21). As the result of the detection, in the case that the state is not the ring-free state, the wheel speed obtaining control is ended; in the case that the state is the ring-free state, a judgment is made as to whether the resolver 20A is faulty (at S22). In the case that the resolver 20A is faulty, the wheel rotation speed detection value RWa is selected as the rotation speed of the right rear wheel RWr (at S29) and the wheel speed obtaining control is ended.

On the other hand, in the case that the resolver 20A is not faulty, the motor rotation speed detection value LMa is detected using the resolver 20A, and the wheel rotation speed detection value LWa is detected using the wheel speed sensor 13A (at S23). Then, the rotation speed of the ring gears 24A and 24B is calculated as the ring gear rotation speed conversion value Rb based on the motor rotation speed detection value LMa and the wheel rotation speed detection value LWa (at S24).

Next, the wheel rotation speed detection value RWa is detected using the wheel speed sensor 13B (at S25), and the motor rotation speed conversion value RMb is calculated based on the ring gear rotation speed conversion value Rb and the wheel rotation speed detection value RWa (at S26). Furthermore, the motor rotation speed detection value RMa is detected using the resolver 20B (at S27), and the motor rotation speed conversion value RMb is compared with the motor rotation speed detection value RMa (at S28).

As the result of the comparison, if the motor rotation speed conversion value RMb is larger than the motor rotation speed detection value RMa (RMb>RMa), the wheel rotation speed detection value RWa is selected and the wheel rotation speed detection value RWa is used as the rotation speed of the right rear wheel RWr (at S29). On the other hand, in the case that the motor rotation speed conversion value RMb is smaller than the motor rotation speed detection value RMa (RMb<RMa), the wheel rotation speed conversion value RWb is calculated based on the ring gear rotation speed conversion value Rb and the motor rotation speed detection value RMa and selected, and the wheel rotation speed conversion value RWb is used as the rotation speed of the right rear wheel RWr (at S30). In the case that the motor rotation speed conversion value RMb is equal to the motor rotation speed detection value RMa (RMb=RMa), the resolvers 20A and 20B and the wheel speed sensors 13A and 13B are all normal, and the wheel rotation speed conversion value RWb or the wheel rotation speed detection value RWa may be used as the rotation speed of the right rear wheel RWr. However, the wheel rotation speed detection value RWa is herein used as the rotation speed of the right rear wheel RWr.

The rotation speed of the right rear wheel RWr judged by the wheel speed obtaining control (A) and the wheel speed obtaining control (B) can be used for various types of control based on the rotation speed of the right rear wheel RWr. For this reason, various types of control for performing control using the rotation speed of the right rear wheel RWr can be improved in robustness. Furthermore, even if any one of the resolvers 20A and 20B and the wheel speed sensors 13A and 13B is faulty, normal control can be continued.

The rotation speed of the right rear wheel RWr judged by the wheel speed obtaining control (A) and the wheel speed obtaining control (B) can be applied to motor traction control described below, for example.

Figure 20:
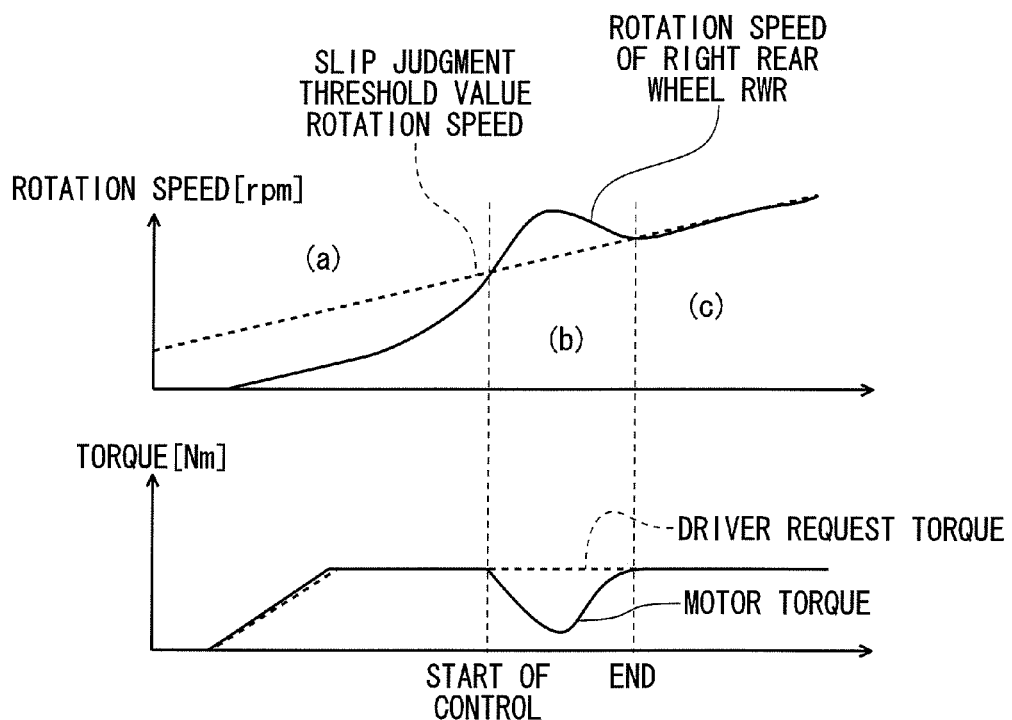
FIG. 20 is a view showing the rotation speed of the right rear wheel and motor torque during motor traction control.

In the case that the difference between the obtained rotation speed of the right rear wheel RWr and a target wheel rotation speed (not shown) serving as the target rotation speed of the right rear wheel RWr obtained by the controller 8 is equal to or more than a predetermined value, that is, as shown in FIG. 20, in the case that the rotation speed of the right rear wheel RWr is compared with the slip judgment threshold value rotation speed obtained based on the target wheel rotation speed of the right rear wheel RWr obtained by the controller 8 and when the rotation speed of the right rear wheel RWr becomes more than the slip judgment threshold value rotation speed, the second electric motor 2B is subjected to torque-down control so that the rotation speed of the right rear wheel RWr becomes close to the target wheel rotation speed.

The control is explained more specifically using FIG. 20. The rotation speed of the right rear wheel RWr is compared with the slip judgment threshold value rotation speed. In the case that the rotation speed of the right rear wheel RWr is equal to or less than the slip judgment threshold value rotation speed as shown in a range (a), the control causes the second electric motor 2B to output its motor torque so that a driver request torque is output. In the case that the rotation speed of the right rear wheel RWr is more than the slip judgment threshold value rotation speed as shown in a range (b), the control decreases the motor torque of the second electric motor 2B. In the case that the rotation speed of the right rear wheel RWr is again equal to or less than the slip judgment threshold value rotation speed as shown in a range (c), the control causes the second electric motor 2B to output its motor torque so that the driver request torque is output.

Figure 21:
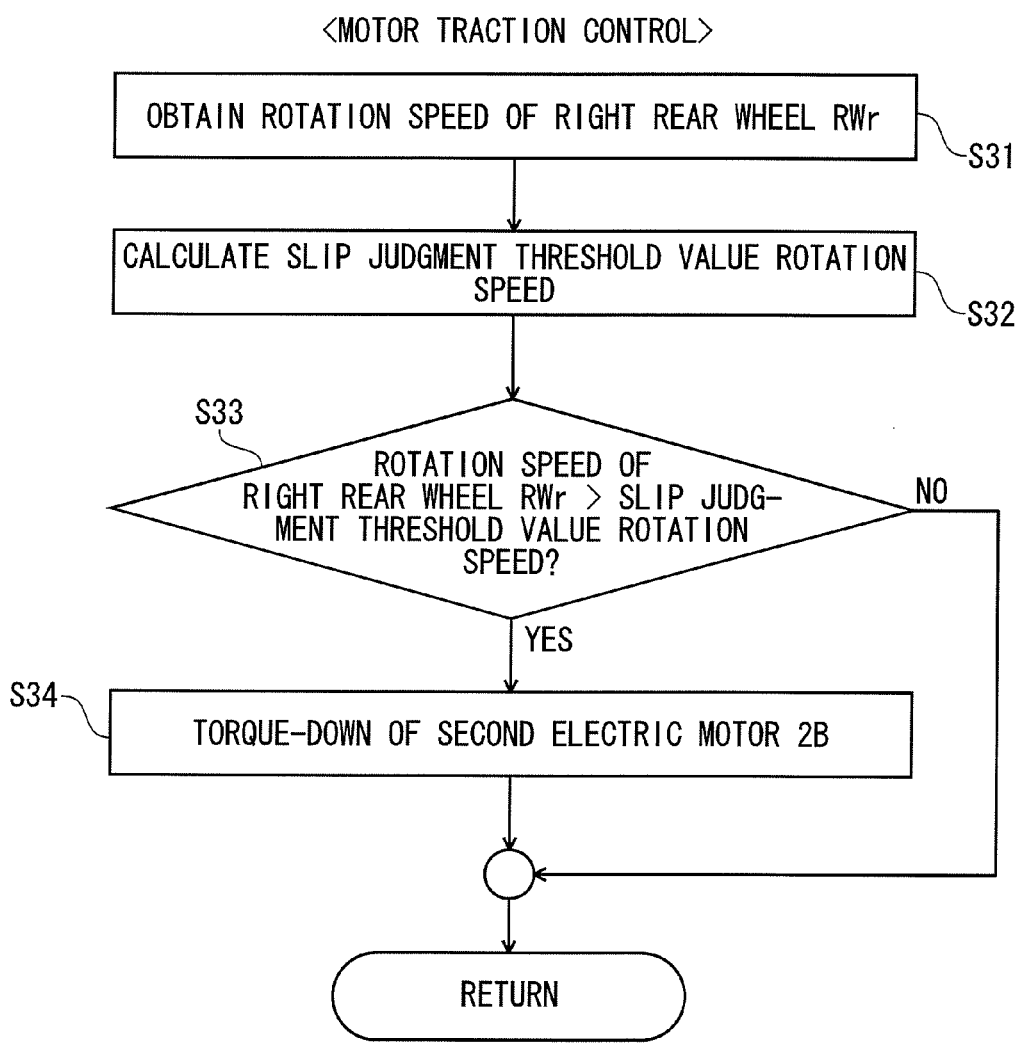
FIG. 21 is a chart showing the control flow of the motor traction control.

The flow of the motor traction control will herein be described referring to FIG. 21. First, the rotation speed of the right rear wheel RWr is obtained by the wheel speed obtaining control (at S31). Then, the slip judgment threshold value rotation speed is calculated based on the target wheel rotation speed (not shown) obtained by the controller 8 (at S32). Then, the rotation speed of the right rear wheel RWr is compared with the slip judgment threshold value rotation speed (at S33). As the result of the comparison, if the rotation speed of the right rear wheel RWr is equal to or less than the slip judgment threshold value rotation speed, a judgment is made that no slip is generated or an allowable range of slip is generated, and the processing is ended. On the other hand, if the rotation speed of the right rear wheel RWr is more than the slip judgment threshold value rotation speed, a judgment is made that an unallowable range of slip is generated, and the second electric motor 2B connected to the right rear wheel RWr is subjected to torque-down control. Consequently, the idle rotation state of the right rear wheel RWr is eliminated quickly, whereby energy consumption can be suppressed and the unstable state of the vehicle 3 can be eliminated.

<Motor Rotation Speed Obtaining Control>

Motor rotation speed obtaining control is performed to obtain motor rotation speed serving as the rotation speed of the second electric motor 2B using the following method (A) or (B) in the above-mentioned ring-free state.

(A) The rotation speed of the ring gears 24A and 24B is obtained as the ring gear rotation speed conversion value Rb based on the motor rotation speed detection value LMa (first rotation state amount detection value) detected using the resolver 20A and the wheel rotation speed detection value LWa (second rotation state amount detection value) detected using the wheel speed sensor 13A, and the motor rotation speed conversion value RMb serving as the rotation speed of the second electric motor 2B at the installation position of the resolver 20B and obtained based on the ring gear rotation speed conversion value Rb and the wheel rotation speed detection value RWa (fourth rotation state amount detection value) detected using the wheel speed sensor 13B or the motor rotation speed detection value RMa (third rotation state amount detection value) of the second electric motor 2B detected using the resolver 20B, whichever larger, is used as the rotation speed of the second electric motor 2B.

(B) The rotation speed of the ring gears 24A and 24B is obtained as the ring gear rotation speed conversion value Rb based on the motor rotation speed detection value LMa detected using the resolver 20A and the wheel rotation speed detection value LWa detected using the wheel speed sensor 13A, and in the case that the wheel rotation speed conversion value RWb serving as the rotation speed of the right rear wheel RWr at the installation position of the wheel speed sensor 13B and obtained based on the ring gear rotation speed conversion value Rb and the motor rotation speed detection value RMa detected using the resolver 20B is larger than the wheel rotation speed detection value RWa detected using the wheel speed sensor 13B (RWb>RWa), the motor rotation speed detection value RMa is used as the rotation speed of the second electric motor 2B; in the case that the wheel rotation speed conversion value RWb is smaller than the wheel rotation speed detection value RWa (RWb<RWa), the motor rotation speed conversion value RMb serving as the rotation speed of the second electric motor 2B at the installation position of the resolver 20B and obtained based on the ring gear rotation speed conversion value Rb and the wheel rotation speed detection value RWa is used as the rotation speed of the second electric motor 2B.

In the case that the resolvers 20A and 20B and the wheel speed sensors 13A and 13B are functioning normally as described above, the wheel rotation speed conversion value RWb is equal to the wheel rotation speed detection value RWa (RWb=RWa), and the motor rotation speed conversion value RMb is equal to the motor rotation speed detection value RMa (RMb=RMa) (see FIG. 13).

On the other hand, in the case that one of the sensors, such as one of the resolvers 20A and 20B and the wheel speed sensors 13A and 13B, is faulty because of wire breakage or the like, a signal indicating a rotation speed lower (including zero rotation speed) than the normal rotation speed is fed from the faulty sensor. As a result, the wheel rotation speed conversion value RWb does not become equal to the wheel rotation speed detection value RWa (RWb≠RWa), and the motor rotation speed conversion value RMb does not become equal to the motor rotation speed detection value RMa (RMb≠RMa).

For example, in the case that the wheel speed sensor 13B is faulty because of wire breakage (see FIG. 14), the wheel rotation speed conversion value RWb becomes larger than the wheel rotation speed detection value RWa (RWb>RWa) and thus becomes a normal value as described above. On the other hand, the motor rotation speed conversion value RMb becomes a negative value smaller than the motor rotation speed detection value RMa (RMb<0<RMa) and thus becomes an abnormal value. Hence, at this time, the motor rotation speed detection value RMa becomes equal to the rotation speed of the second electric motor 2B.

Furthermore, in the case that the resolver 20B is faulty because of wire breakage (see FIG. 15), the wheel rotation speed conversion value RWb becomes smaller than the wheel rotation speed detection value RWa (RWb<RWa) and thus becomes an abnormal value as described above. On the other hand, the motor rotation speed conversion value RMb becomes larger than the motor rotation speed detection value RMa (RMb>RMa) and thus becomes a normal value. Hence, at this time, the motor rotation speed conversion value RMb becomes equal to the rotation speed of the second electric motor 2B.

Moreover, in the case that the resolver 20A is faulty because of wire breakage (see FIG. 17), the wheel rotation speed conversion value RWb becomes larger than the wheel rotation speed detection value RWa detected using the normal wheel speed sensor 13B (RWb>RWa) and thus becomes an abnormal value as described above. What's more, the motor rotation speed conversion value RMb becomes a value smaller than the motor rotation speed detection value RMa detected using the normal resolver 20B (RMb<RMa) and thus becomes an abnormal value. Hence, at this time, the motor rotation speed detection value RMa becomes equal to the rotation speed of the second electric motor 2B.

As described above, it is understood that even in the case that the wheel speed sensor 13B, the resolver 20A or the resolver 20B is faulty, the motor rotation speed conversion value RMb or the motor rotation speed detection value RMa, whichever larger, should only be used as the rotation speed of the second electric motor 2B by using the control method of the above-mentioned motor rotation speed obtaining control (A). It is also understood that in the case that the wheel rotation speed conversion value RWb is larger than the wheel rotation speed detection value RWa (RWb>RWa in the cases in FIGS. 14 and 17), the motor rotation speed detection value RMa should only be used as the rotation speed of the second electric motor 2B and that in the case that the wheel rotation speed conversion value RWb is smaller than the wheel rotation speed detection value RWa (RWb<RWa in the case in FIG. 15), the motor rotation speed conversion value RMb should only be used as the rotation speed of the second electric motor 2B by using the control method of the above-mentioned motor rotation speed obtaining control (B).

Still further, in the case that the wheel speed sensor 13A is faulty because of wire breakage (see FIG. 16), the wheel rotation speed conversion value RWb becomes zero and smaller than the wheel rotation speed detection value RWa (RWb=0<RWa) and thus becomes an abnormal value as described above. Similarly, the motor rotation speed conversion value RMb becomes a value larger than the motor rotation speed detection value RMa (RMb>RMa) and thus becomes an abnormal value. Hence, at this time, the motor rotation speed detection value RMa becomes equal to the rotation speed of the second electric motor 2B.

As described above, in the case that the wheel speed sensor 13A is faulty, it is understood that it is improper to use the motor rotation speed conversion value RMb, the larger value between the motor rotation speed conversion value RMb and the motor rotation speed detection value RMa, as the rotation speed of the second electric motor 2B by using the control method of the above-mentioned motor rotation speed obtaining control (A). It is also understood that in the case that the wheel rotation speed conversion value RWb is smaller than the wheel rotation speed detection value RWa (RWb<RWa), it is improper that the motor rotation speed conversion value RMb is used as the rotation speed of the second electric motor 2B by using the control method of the above-mentioned motor rotation speed obtaining control (B). For this reason, in this case, it is proper that the motor rotation speed detection value RMa is used as the rotation speed of the second electric motor 2B.

Hence, in the control methods of the above-mentioned motor rotation speed obtaining control (A) and motor rotation speed obtaining control (B), a judgment is made beforehand as to whether the wheel speed sensor 13A is faulty. In the case that the wheel speed sensor 13A is faulty, the motor rotation speed detection value RMa detected using the resolver 20B is used as the rotation speed of the second electric motor 2B. In the case that the wheel speed sensor 13A is not faulty, the above-mentioned normal control is performed.

More specifically, in the control method of the above-mentioned motor rotation speed obtaining control (A), as shown in FIG. 22, first, a detection is made as to whether the state is the ring-free state (at S41). The detection as to whether the state is the ring-free state may be made by detecting whether the one-way clutch 50 is engaged and the hydraulic brakes 60A and 60B are engaged, or the detection may also be made using sensors provided for the ring gears 24A and 24B (the same applies to the following control (B)). As the result of the detection, in the case that the state is not the ring-free state, the motor rotation speed obtaining control is ended; in the case that the state is the ring-free state, a judgment is made as to whether the wheel speed sensor 13A is faulty (at S42). In the case that the wheel speed sensor 13A is faulty, the motor rotation speed detection value RMa is selected as the rotation speed of the second electric motor 2B (at S50) and the motor rotation speed obtaining control is ended.

On the other hand, in the case that the wheel speed sensor 13A is not faulty, the motor rotation speed detection value LMa is detected using the resolver 20A, and the wheel rotation speed detection value LWa is detected using the wheel speed sensor 13A (at S43). Then, the rotation speed of the ring gears 24A and 24B is calculated as the ring gear rotation speed conversion value Rb based on the motor rotation speed detection value LMa and the wheel rotation speed detection value LWa (at S44).

Next, the wheel rotation speed detection value RWa is detected using the wheel speed sensor 13B (at S45), and the motor rotation speed conversion value RMb is calculated based on the ring gear rotation speed conversion value Rb and the wheel rotation speed detection value RWa (at S46). Furthermore, the motor rotation speed detection value RMa is detected using the resolver 20B (at S47), and the motor rotation speed conversion value RMb is compared with the motor rotation speed detection value RMa (at S48).

As the result of the comparison, if the motor rotation speed conversion value RMb is larger than the motor rotation speed detection value RMa (RMb>RMa), the motor rotation speed conversion value RMb is selected and the motor rotation speed conversion value RMb is used as the rotation speed of the second electric motor 2B (at S49). On the other hand, in the case that the motor rotation speed conversion value RMb is smaller than the motor rotation speed detection value RMa (RMb<RMa), the motor rotation speed detection value RMa is selected and the motor rotation speed detection value RMa is used as the rotation speed of the second electric motor 2B (at S50). In the case that the motor rotation speed conversion value RMb is equal to the motor rotation speed detection value RMa (RMb=RMa), the resolvers 20A and 20B and the wheel speed sensors 13A and 13B are all normal, and the motor rotation speed conversion value RMb or the motor rotation speed detection value RMa may be used as the rotation speed of the second electric motor 2B. However, the motor rotation speed detection value RMa is herein used as the rotation speed of the second electric motor 2B.

In the control method of the above-mentioned motor rotation speed obtaining control (B), as shown in FIG. 23, first, a detection is made as to whether the state is the ring-free state (at S51). As the result of the detection, in the case that the state is not the ring-free state, the motor rotation speed obtaining control is ended; in the case that the state is the ring-free state, a judgment is made as to whether the wheel speed sensor 13A is faulty (at S52). In the case that the wheel speed sensor 13A is faulty, the motor rotation speed detection value RMa is selected as the rotation speed of the second electric motor 2B (at S59) and the motor rotation speed obtaining control is ended.

On the other hand, in the case that the wheel speed sensor 13A is not faulty, the motor rotation speed detection value LMa is detected using the resolver 20A, and the wheel rotation speed detection value LWa is detected using the wheel speed sensor 13A (at S53). Then, the rotation speed of the ring gears 24A and 24B is calculated as the ring gear rotation speed conversion value Rb based on the motor rotation speed detection value LMa and the wheel rotation speed detection value LWa (at S54).

Next, the motor rotation speed detection value RMa is detected using the resolver 20B (at S55), and the wheel rotation speed conversion value RWb is calculated based on the ring gear rotation speed conversion value Rb and the motor rotation speed detection value RMa (at S56). Furthermore, the wheel rotation speed detection value RWa is detected using the wheel speed sensor 13B (at S57), and the wheel rotation speed conversion value RWb is compared with the wheel rotation speed detection value RWa (at S58).

As the result of the comparison, if the wheel rotation speed conversion value RWb is larger than the wheel rotation speed detection value RWa (RWb>RWa), the motor rotation speed detection value RMa is selected and the motor rotation speed detection value RMa is used as the rotation speed of the second electric motor 2B (at S59). On the other hand, in the case that the wheel rotation speed conversion value RWb is smaller than the wheel rotation speed detection value RWa (RWb<RWa), the motor rotation speed conversion value RMb is calculated based on the ring gear rotation speed conversion value Rb and the wheel rotation speed detection value RWa and selected, and the motor rotation speed conversion value RMb is used as the rotation speed of the second electric motor 2B (at S60). In the case that the wheel rotation speed conversion value RWb is equal to the wheel rotation speed detection value RWa (RWb=RWa), the resolvers 20A and 20B and the wheel speed sensors 13A and 13B are all normal, and the motor rotation speed conversion value RMb or the motor rotation speed detection value RMa may be used as the rotation speed of the second electric motor 2B. However, the motor rotation speed detection value RMa is herein used as the rotation speed of the second electric motor 2B.

The rotation speed of the second electric motor 2B judged by the motor rotation speed obtaining control (A) and the motor rotation speed obtaining control (B) can be used for various types of control based on the rotation speed of the second electric motor 2B. For this reason, various types of control for performing control using the rotation speed of the second electric motor 2B can be improved in robustness. Furthermore, even if any one of the resolvers 20A and 20B and the wheel speed sensors 13A and 13B is faulty, normal control can be continued.

The above-mentioned motor traction control may be performed based on the rotation speed of the second electric motor 2B. In this case, when the difference between the obtained rotation speed of the second electric motor 2B and the target motor rotation speed serving as the target rotation speed of the second electric motor 2B obtained by the controller 8 is equal to or more than a predetermined value, that is, in the case that the obtained rotation speed of the second electric motor 2B is compared with the slip judgment threshold value rotation speed obtained based on the target motor rotation speed of the second electric motor 2B obtained by the controller 8 and when the rotation speed of the second electric motor 2B becomes more than the slip judgment threshold value rotation speed, the second electric motor 2B is subjected to torque-down control. On the other hand, in the case that the motor rotation speed is equal to or less than the slip judgment threshold value rotation speed, the control causes the second electric motor 2B to output its motor torque so that the driver request torque is output.

The present invention is not limited to the above-mentioned embodiment but can be modified, improved, etc. appropriately.

For example, although the rotation speed of the right rear wheel RWr and the rotation speed of the second electric motor 2B are obtained by performing the wheel speed obtaining control and the motor rotation speed obtaining control in the above-mentioned embodiment, it is also possible to obtain the rotation speed of the left rear wheel LWr and the rotation speed of the first electric motor 2A by reversing the configuration of the present invention from right to left.

Furthermore, in the above-mentioned embodiment, the motor rotation speed detection values LMa and RMa serving as the first and third rotation state amounts are detected using the resolvers 20A and 20B, and the wheel rotation speed detection values LWa and RWa serving as the second and fourth rotation state amounts are detected using the wheel speed sensors 13A and 13B. However, the present invention is not limited to the above-mentioned configuration. The first and third rotation state amounts may be used as the rotation speeds of components (for example, the sun gears 21A and 21B of the first and second planetary gear reducers 12A and 12B) rotating together with the first and second electric motors 2A and 2B during the ring-free control or the rotation speeds of components rotating at constant ratios with respect to the rotation speeds of the first and second electric motors 2A and 2B during the ring-free control. Furthermore, the second and fourth rotation state amounts may be used as the rotation speeds of components (for example, the planetary carriers 23A and 23B of the first and second planetary gear reducers 12A and 12B) rotating together with the left and right wheels LWr and RWr during the ring-free control or the rotation speeds of components rotating at constant ratios with respect to the rotation speeds of the left and right wheels LWr and RWr during the ring-free control. In the case of the configuration described above, a sensor is disposed appropriately at each component to be subjected to detection so that its rotation speed can be detected.

Moreover, the hydraulic brakes 60A and 60B are not required to be provided for the ring gears 24A and 24B, respectively. At least one hydraulic brake and one one-way clutch 50 should only be provided for the connected ring gears 24A and 24B. What's more, the one-way clutch may be omitted.

In addition, although the hydraulic brake is taken as an example of the rotation restrictor, without being limited to this type, a mechanical type, an electromagnetic type, etc. can be selected as desired.

Furthermore, although the first and second electric motors 2A and 2B are connected to the sun gears 21A and 21B and the ring gears are connected to each other, without being limited to this configuration, the sun gears may be connected to each other, and the first and second electric motors 2A and 2B may be connected to the ring gears.

Moreover, the front wheel drive unit may be driven by using an electric motor as only one drive source, without using the internal combustion engine.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:
1. A vehicle drive device comprising:
a vehicle controller;
a left wheel drive unit comprising:
  a first electric motor that drives a left wheel of a vehicle; and
  a first speed changer disposed on a first power transmission path between the first electric motor and the left wheel,
a right wheel drive unit comprising:
  a second electric motor that drives a right wheel of the vehicle; and
  a second speed changer disposed on a second power transmission path between the second electric motor and the right wheel, and
an electric motor controller that controls the first electric motor and the second electric motor, wherein
each of the first and second speed changers comprises first to third rotation elements,
the first electric motor is connected to the first rotation element of the first speed changer,
the second electric motor is connected to the first rotation element of the second speed changer,
the left wheel is connected to the second rotation element of the first speed changer,
the right wheel is connected to the second rotation element of the second speed changer,
the third rotation element of the first speed changer and the third rotation element of the second speed changer are connected to each other,
wherein the vehicle drive device further comprises:
a first rotation state amount detector disposed to detect a first rotation state amount serving as a rotation state amount of the first electric motor or a rotation state amount of the first rotation element of the first speed changer;
a second rotation state amount detector disposed to detect a second rotation state amount serving as a rotation state amount of the left wheel or a rotation state amount of the second rotation element of the first speed changer;
a third rotation state amount detector disposed to detect a third rotation state amount serving as a rotation state amount of the second electric motor or a rotation state amount of the first rotation element of the second speed changer: and
a fourth rotation state amount detector disposed to detect a fourth rotation state amount serving as a rotation state amount of the right wheel or a rotation state amount of the second rotation element of the second speed changer,
wherein the vehicle controller is configured to determine the fourth rotation state amount by the following (A) or (B):
(A) the vehicle controller is configured to calculate a rotation state amount of the third rotation element as a third rotation element rotation state amount conversion value by using a first rotation state amount detection value detected by the first rotation state amount detector and a second rotation state amount detection value detected by the second rotation state amount detector, and the vehicle controller is configured to determine that a fourth rotation state amount conversion value or a fourth rotation state amount detection value, whichever is greater, is used as the fourth rotation state amount, wherein the fourth rotation state amount conversion value serves as a rotation state amount at an installation position of the fourth rotation state amount detector and the vehicle controller is configured to calculate the fourth rotation state amount conversion value by using the third rotation element rotation state amount conversion value and a third rotation state amount detection value detected by the third rotation state amount detector, wherein the fourth rotation state amount detection value is detected using the fourth rotation state amount detector, (B) the vehicle controller is configured to calculate the rotation state amount of the third rotation element as a third rotation element rotation state amount conversion value by using a first rotation state amount detection value detected by the first rotation state amount detector and a second rotation state amount detection value detected by the second rotation state amount detector, and the vehicle controller is configured to calculate a third rotation state amount conversion value serving as a rotation state amount at an installation position of the third rotation state amount detector by using the third rotation element rotation state amount conversion value and a fourth rotation state amount detection value detected by the fourth rotation state amount detector, and determine whether third rotation state amount conversion value is larger than a third rotation state amount detection value detected by the third rotation state amount detector, and if so, the vehicle controller is configured to use the fourth rotation state amount detection value is used as the fourth rotation state amount, and if the third rotation state amount conversion value is smaller than the third rotation state amount detection value, the vehicle controller is configured to use a fourth rotation state amount conversion value as the fourth rotation state amount, wherein the fourth rotation state amount conversion value serves as a rotation state amount at an installation position of the fourth rotation state amount detector and is obtained by using the third rotation element rotation state amount conversion value and the third rotation state amount detection value.

2. The vehicle drive device of claim 1, wherein the electric motor controller obtains a target fourth rotation state amount serving as a target rotation state amount of the fourth rotation state amount, and when a difference between the target fourth rotation state amount and the fourth rotation state amount is equal to or more than a predetermined value, the controller controls the second electric motor such that the fourth rotation state amount becomes close to the target fourth rotation state amount.

3. The vehicle drive device of claim 1, the vehicle drive device further comprises:

a rotation restrictor configured to lock the third rotation elements to restrict the rotation of the third rotation elements and to release the third rotation elements; and a rotation restrictor controller configured to control the rotation restrictor such that the rotation restrictor locks or releases the third rotation elements, wherein the fourth rotation state amount is obtained using the method (A) or (B) when the rotation restrictor controller controls the rotation restrictor such that the rotation restrictor releases the third rotation elements.

4. The vehicle drive device of claim 2, the vehicle drive device further comprises:

a rotation restrictor configured to lock the third rotation elements to restrict the rotation of the third rotation elements and to release the third rotation elements; and a rotation restrictor controller configured to control the rotation restrictor such that the rotation restrictor locks or releases the third rotation elements, wherein the fourth rotation state amount is obtained using the method (A) or (B) when the rotation restrictor controller controls the rotation restrictor such that the rotation restrictor releases the third rotation elements.

5. A method of controlling a vehicle drive device, wherein the vehicle drive device comprises:

a left wheel drive unit comprising:
  a first electric motor that drives a left wheel of a vehicle; and
  a first speed changer disposed on a first power transmission path between the first electric motor and the left wheel, a right wheel drive unit comprising:
  a second electric motor that drives a right wheel of the vehicle; and
  a second speed changer disposed on a second power transmission path between the second electric motor and the right wheel, and an electric motor controller that controls the first electric motor and the second electric motor, wherein each of the first and second speed changers comprises first to third rotation elements, the first electric motor is connected to the first rotation element of the first speed changer, the second electric motor is connected to the first rotation element of the second speed changer, the left wheel is connected to the second rotation element of the first speed changer, the right wheel is connected to the second rotation element of the second speed changer, the third rotation element of the first speed changer and the third rotation element of the second speed changer are connected to each other, wherein the vehicle drive device further comprises:

a first rotation state amount detector disposed to detect a first rotation state amount serving as a rotation state amount of the first electric motor or a rotation state amount of the first rotation element of the first speed changer:

a second rotation state amount detector disposed to detect a second rotation state amount serving as a rotation state amount of the left wheel or a rotation state amount of the second rotation element of the first speed changer;

a third rotation state amount detector disposed to detect a third rotation state amount serving as a rotation state amount of the second electric motor or a rotation state amount of the first rotation element of the second speed changer; and a fourth rotation state amount detector disposed to detect a fourth rotation state amount serving as a rotation state amount of the right wheel or a rotation state amount of the second rotation element of the second speed changer, the method comprising determining the fourth rotation state amount by the following process (A) or (B), the process (A) comprising:

a first detection step of detecting a first rotation state amount detection value using the first rotation state amount detector;
a second detection step of detecting a second rotation state amount detection value using the second rotation state amount detector;
a first conversion step of obtaining, using a computer, a third rotation element rotation state amount conversion value, by using the first rotation state amount detection value and a second rotation state amount detection value;
a third detection step of detecting a third rotation state amount detection value using the third rotation state amount detector;
a second conversion step of obtaining, using the computer, a fourth rotation state amount conversion value serving as a rotation state amount at an installation position of the fourth rotation state amount detector, by using the third rotation element rotation state amount conversion value and the third rotation state amount detection value;
a fourth detection step of detecting a fourth rotation state amount detection value using the fourth rotation state amount detector; and
a wheel rotation speed selection step of selecting, using the computer, the fourth rotation state amount conversion value or the fourth rotation state amount detection value, whichever is greater, as the fourth rotation state amount, and the process (B) comprising:
a first detection step of detecting a first rotation state amount detection value using the first rotation state amount detector;
a second detection step of detecting a second rotation state amount detection value using the second rotation state amount detector;
a first conversion step of obtaining, using a computer, a third rotation element rotation state amount conversion value, by using the first rotation state amount detection value and the second rotation state amount detection value;
a third detection step of detecting a fourth rotation state amount detection value using the fourth rotation state amount detector;
a second conversion step of obtaining, using the computer, a third rotation state amount conversion value serving as a rotation state amount at an installation position of the third rotation state amount detector, by using the third rotation element rotation state amount conversion value and the fourth rotation state amount detection value;
a fourth detection step of detecting a third rotation state amount detection value using the third rotation state amount detector;
a wheel rotation speed selection step of selecting, using the computer, the fourth rotation state amount detection value as the fourth rotation state amount when the third rotation state amount conversion value is larger than the third rotation state amount detection value;
a third conversion step of obtaining, using the computer, a fourth rotation state amount conversion value serving as a rotation state amount at an installation position of the fourth rotation state amount detector, by using the third rotation element rotation state amount conversion value and the third rotation state amount detection value; and
a wheel rotation speed selection step of selecting, using the computer, the fourth rotation state amount conversion value as the fourth rotation state amount when the third rotation state amount conversion value is smaller than the third rotation state amount detection value.

* * * * *